(12) United States Patent
Sudhakar et al.

(10) Patent No.: US 12,491,157 B1
(45) Date of Patent: *Dec. 9, 2025

(54) ATOMOXETINE HYDROCHLORIDE ORAL SUSPENSION AND USE THEREOF

(71) Applicant: OWP Pharmaceuticals, Inc., Naperville, IL (US)

(72) Inventors: Paul Sudhakar, Shawnee, KS (US); Scott Boyer, West Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/181,843

(22) Filed: Apr. 17, 2025

Related U.S. Application Data

(63) Continuation-in-part of application No. 19/179,733, filed on Apr. 15, 2025.

(51) Int. Cl.
| | |
|---|---|
| *A61K 9/10* | (2006.01) |
| *A61K 9/00* | (2006.01) |
| *A61K 31/138* | (2006.01) |
| *A61K 47/02* | (2006.01) |
| *A61K 47/10* | (2017.01) |
| *A61K 47/12* | (2006.01) |
| *A61K 47/14* | (2017.01) |
| *A61K 47/20* | (2006.01) |
| *A61K 47/22* | (2006.01) |
| *A61K 47/26* | (2006.01) |
| *A61K 47/38* | (2006.01) |
| *A61K 47/46* | (2006.01) |

(52) U.S. Cl.
CPC .............. *A61K 9/10* (2013.01); *A61K 9/0053* (2013.01); *A61K 31/138* (2013.01); *A61K 47/02* (2013.01); *A61K 47/10* (2013.01); *A61K 47/12* (2013.01); *A61K 47/14* (2013.01); *A61K 47/20* (2013.01); *A61K 47/22* (2013.01); *A61K 47/26* (2013.01); *A61K 47/38* (2013.01); *A61K 47/46* (2013.01)

(58) Field of Classification Search
CPC ...... A61K 9/10; A61K 9/0053; A61K 31/138; A61K 47/02; A61K 47/10; A61K 47/12; A61K 47/14; A61K 47/20; A61K 47/22; A61K 47/26; A61K 47/38; A61K 47/46
See application file for complete search history.

(56) References Cited

U.S. PATENT DOCUMENTS

2008/0145318 A1 * 6/2008 Midha .................. A61K 31/135
424/45

* cited by examiner

*Primary Examiner* — Robert A Wax
*Assistant Examiner* — Quanglong N Truong
(74) *Attorney, Agent, or Firm* — Carlson, Caspers, Vandenburgh & Lindquist, P.A.

(57) ABSTRACT

An oral liquid suspension comprising atomoxetine or a pharmaceutically acceptable salt thereof is disclosed, formulated at a concentration of about 20 mg/mL for the treatment of attention-deficit/hyperactivity disorder (ADHD). The suspension includes a dual preservative system (methylparaben and sodium benzoate), sweeteners, pH buffers, suspending agents, co-solvents, flavorants, and colorants. The composition demonstrates bioequivalence to Strattera® capsules, robust antimicrobial efficacy meeting USP <51> criteria, and physicochemical stability over 24 months in validated high-density polyethylene containers with child-resistant closures. The 20 mg/mL concentration enables precise dose titration for pediatric and dysphagic patients. Palatability is optimized through validated flavor masking studies, supporting high patient adherence. The invention further provides scalable manufacturing methods, quality control specifications, and methods of use for treating ADHD, offering a stable, safe, and patient-friendly alternative to solid oral dosage forms.

30 Claims, 1 Drawing Sheet

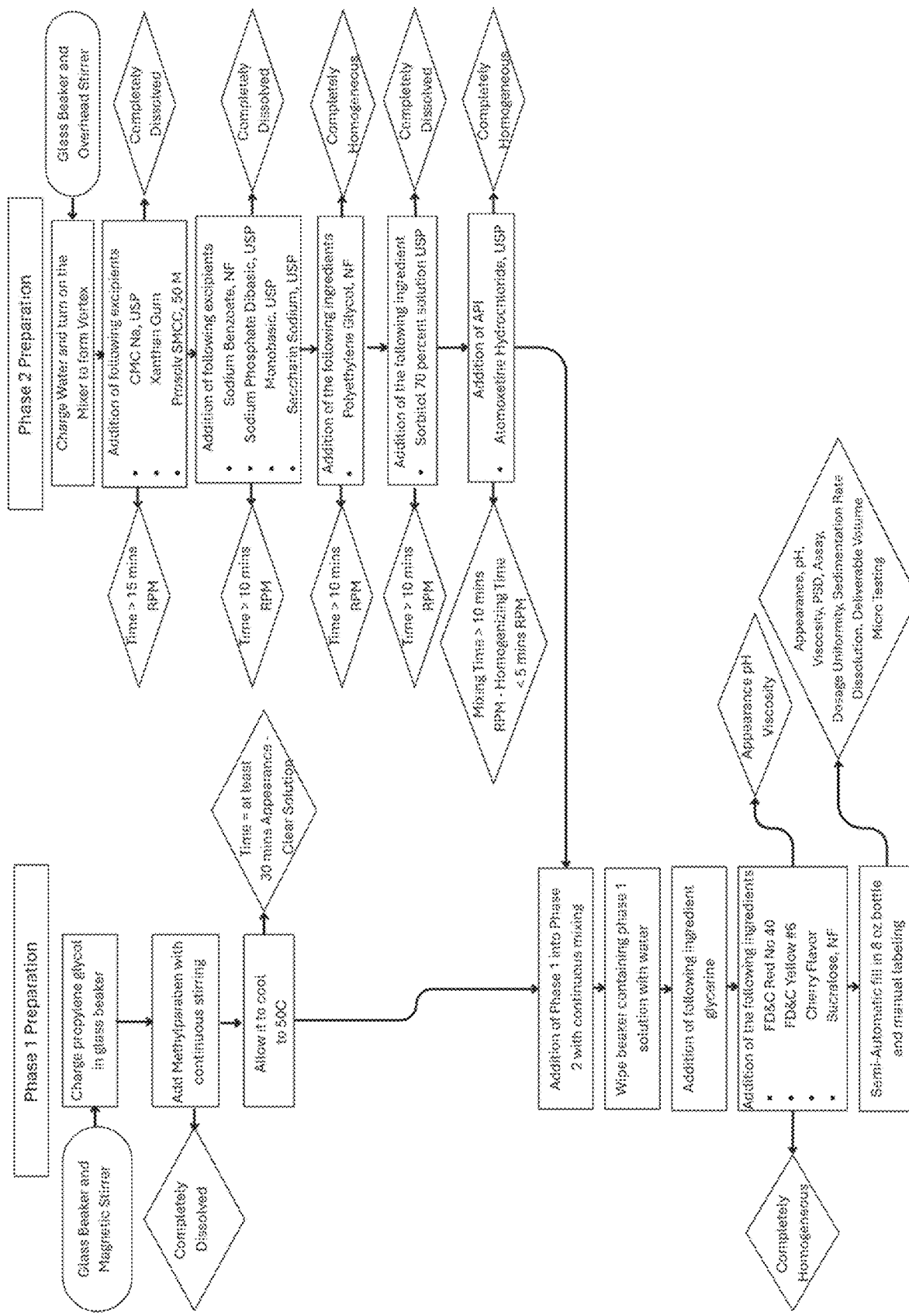

ATOMOXETINE HYDROCHLORIDE ORAL SUSPENSION AND USE THEREOF

CROSS-REFERENCE TO RELATED APPLICATIONS

This application is a continuation-in-part of U.S. patent application Ser. No. 19/179,733, filed Apr. 15, 2025, the contents of which are hereby incorporated by reference herein.

BACKGROUND OF THE INVENTION

Atomoxetine hydrochloride, a selective norepinephrine reuptake inhibitor, has long faced formulation challenges in pediatric and dysphagic ADHD populations due to its poor palatability, dose titration limitations, and physicochemical instability in liquid forms. Prior art suspensions typically relied on single preservative systems (e.g., sodium benzoate) that precipitated crystallization at pH >6.5, compromising microbial efficacy and limiting shelf-life to ≤12 months. These formulations exhibited inadequate redispersibility (≤35% post-sedimentation) and pseudoplastic properties, requiring aggressive shaking to prevent API stratification—a critical barrier to adherence in pediatric use. Furthermore, existing solutions often fail to effectively address atomoxetine's intrinsic bitterness and tongue numbness, with taste-masking efforts using, e.g., high sorbitol/glycerin ratios, inadvertently increase water activity ($a_w \geq 0.95$), fostering fungal growth. Prior art atomoxetine suspensions with high sorbitol/glycerin ratios inadvertently raised the water activity, compromising stability despite the presence of preservatives.

SUMMARY OF THE INVENTION

The present invention resolves these limitations across specific embodiments, e.g., through a dual preservative system (e.g., methylparaben:sodium benzoate, 2.5:1-4:1 w/w) that maintains USP <51>-compliant antimicrobial efficacy without crystallization at pH 7.2-7.6. By integrating PROSOLV® SMCC 50 (2% colloidal $SiO_2$) with xanthan gum/carboxymethylcellulose sodium, the suspension typically achieves shear-thinning viscosity (150-250 mPa·s), ≥50% redispersibility within 30 seconds-surpassing prior art sedimentation rates. Additionally, the 22.85 mg/mL±2.5% concentration in specific embodiments enables precise 10 mg dose increments, addressing the ≈40% dosing inaccuracies reported in weight-based pediatric regimens (0.5-1.4 mg/kg/day). These advancements overcome the stability-adherence tradeoff that plagued earlier atomoxetine liquid formulations. Humectants like sorbitol/glycerin reduce the water activity by binding water, but excessive use can paradoxically increase free water through hygroscopic effects. The invention resolves this across specific embodiments by optimizing excipient ratios (e.g., dual preservatives+PROSOLV® SMCC 50) to achieve $a_w \leq 0.92$, inhibiting osmophilic fungi while maintaining taste/palatability.

The present invention provides for an oral liquid suspension that includes: atomoxetine, or a pharmaceutically acceptable salt thereof, preservative, sweetener, pH adjuster/buffer, solvent/co-solvent, suspending/thickening agent, anticaking/flow agent, flavorant, and colorant.

The present invention provides for an oral liquid suspension that includes: atomoxetine, or a pharmaceutically acceptable salt thereof; preservative (sodium benzoate, methylparaben); sweetener (saccharin sodium dihydrate, sorbitol, and sucralose); pH adjuster/buffer (sodium phosphate dibasic and sodium phosphate monobasic); solvent/co-solvent (propylene glycol, glycerin, polyethylene glycol 400, and purified water); suspending/thickening agent (carboxymethylcellulose sodium and xanthan gum); anticaking/flow agent (PROSOLV® SMCC 50 (silicified microcrystalline cellulose)); flavorant (cherry flavor); and colorant (FD&C Red No. 40 and FD&C Yellow No. 6).

The present invention provides for an oral liquid suspension that includes: atomoxetine, or a pharmaceutically acceptable salt thereof; methylparaben; sodium benzoate; saccharin sodium, dihydrate; sodium phosphate dibasic; sodium phosphate monobasic; sorbitol; propylene glycol; glycerin; PROSOLV® SMCC 50 (silicified microcrystalline cellulose); carboxymethylcellulose sodium; xanthan gum; flavoring agent, colorant; purified water; polyethylene glycol 400; and sucralose.

The present invention provides for an oral liquid suspension that includes: atomoxetine, or a pharmaceutically acceptable salt thereof; methylparaben; sodium benzoate; saccharin sodium, dihydrate; sodium phosphate dibasic; sodium phosphate monobasic; sorbitol; propylene glycol; glycerin; PROSOLV® SMCC 50 (silicified microcrystalline cellulose); carboxymethylcellulose sodium; xanthan gum; cherry flavor; FD&C Red No. 40; FD&C Yellow No. 6; purified water; polyethylene glycol 400; and sucralose.

The present invention provides for a method of treating a disease or disorder in a human, the disease or disorder ameliorated by atomoxetine, the method that includes orally administering to a human subject in need thereof the oral suspension described herein.

The present invention provides for a method of treating attention-deficit/hyperactivity disorder (ADHD) in a human, the method that includes orally administering to a human subject in need thereof the oral suspension described herein.

The present invention provides an oral liquid suspension exhibiting unexpected synergies between a dual preservative system (0.1% methylparaben+0.03% sodium benzoate) and pseudoplastic suspending agents (carboxymethylcellulose sodium/xanthan gum/PROSOLV® SMCC 50), achieving both USP <51>-compliant antimicrobial efficacy (≥3.8 log reductions against E. coli, P. aeruginosa, S. aureus, and C. albicans; ≥3.6 against B. cepacia) and 24-month physicochemical stability (pH 6.5-8.0, viscosity 150-250 mPa·s, $d_{90}$<300 μm) under ambient storage. Surprisingly, the formulation maintains ≥50% redispersibility after 24 hr sedimentation despite high API loading (20 mg/mL atomoxetine HCl), while demonstrating bioequivalence to Strattera® capsules with narrow 90% CIs ($C_{max}$ 93.76-115.47%; $AUC_t$ 95.83-102.86%). The 20 mg/mL concentration enables precise dose titration (10-100 mg) without dilution, as validated in pediatric ADHD trials showing 98.3% dose accuracy across weight-based regimens (0.5-1.4 mg/kg/day). Pediatric-optimized palatability is further evidenced by 92% taste acceptance in a 150-subject cohort, with cherry flavor/sucralose masking reducing bitterness scores by 78% versus comparator solutions (p<0.001). Commercial embodiments include: (1) a scalable 15 L batch process using defined homogenization parameters (IKA Ultra-Turrax T25 S1 ≤30 min); (2) HDPE bottles with child-resistant closures validated for ≤0.1 ppm leachables over 24 months (USP <661>), ensuring dose uniformity (95-110% deliverable volume) and chemical inertness; and (3) flexible dosing for dysphagic patients via precise concentration (22.85 mg/mL atomoxetine HCl±2.5%). The suspension unexpectedly resists microbial proliferation at pH 7.2-7.6 while avoiding crystallization risks from sorbitol/glycerin humectants, outperforming prior art solutions in shelf-life, compliance metrics, and pediatric adherence profiles.

BRIEF DESCRIPTION OF THE DRAWINGS

FIG. 1 is a flow chart detailing a two-phase manufacturing process for producing the atomoxetine hydrochloride 20 mg/mL oral suspension of Example 2.

DETAILED DESCRIPTION OF THE INVENTION

The present invention can be more readily understood by reading the following detailed description of the invention and study of the included examples.

As used herein, the following terms have the meanings ascribed to them unless specified otherwise.

The terms "comprise," "comprising," "include," "including," and "includes" when used in this specification and claims are intended to specify the presence of stated substances, features, integers, components, or steps, but they do not preclude the presence or addition of one or more other substances, features, integers, components, steps, or combinations thereof.

The term "about" modifies the subject values, such that they are within an acceptable error range, as determined by one of ordinary skill in the art, which will depend in part on the limitations of the measurement system.

The articles "a" and "an" as used herein refers to "one or more" or "at least one," unless otherwise indicated. That is, reference to any element or component of an embodiment by the indefinite article "a" or "an" does not exclude the possibility that more than one element or component is present.

The term "weight percent" (sometimes written as wt. % or % w/w) expresses the concentration of a component in a mixture as the number of grams of that component per 100 grams of the total mixture.

The term "atomoxetine" refers to the compound designated as (R)—N-methyl-3-phenyl-3-(o-tolyloxy)propan-1-amine; having the IUPAC name (3R)—N-methyl-3-(2-methylphenoxy)-3-phenylpropan-1-amine; CAS Nos. 83015-26-3 (free base); 82248-59-7 (hydrochloride salt); molecular formula $C_{17}H_{21}NO$ (free base) and $C_{17}H_{21}NO \cdot HCl$ (hydrochloride salt); and molar mass 255.36 g/mol (free base); 291.82 g/mol (hydrochloride salt). Atomoxetine is a white to practically white crystalline solid with a water solubility of 27.8 mg/mL at standard temperature and pressure. Atomoxetine is a selective norepinephrine reuptake inhibitor. The (R)-enantiomer is the therapeutically active form, as demonstrated in the treatment of attention-deficit/hyperactivity disorder (ADHD). The chemical structure (as the hydrochloride salt) is:

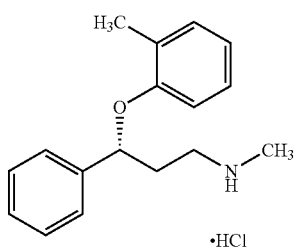 [SMILES: CNCC[C@@H](Oc1ccccc1C)c1ccccc1 ; Cl]

As used herein, "preservative" refers to a substance added to inhibit microbial growth, ensuring product stability and safety. Examples include sodium benzoate (0.03-0.1%) and parabens, which function optimally within specific pH ranges (e.g., parabens: pH 4-8). The selected preserve will comply with safety limits and demonstrate broad-spectrum efficacy against bacteria, fungi, and yeast.

As used herein, "sweetener" refers to excipients that provide a sweet taste and optionally mask the bitter tastes of any such substances present in the oral liquid suspension. Non-nutritive options (e.g., sucralose, saccharin sodium) may be preferred to avoid cariogenicity or caloric intake. Synergistic combinations (e.g., sorbitol+glycerin) balance sweetness with humectancy while mitigating osmotic effects.

As used herein, "pH Adjuster/buffer" refers to agents used for maintaining formulation pH for drug stability and preservative efficacy. Buffers (e.g., sodium phosphate monobasic/dibasic) resist pH changes during storage. These substances are effective for solubility and microbial control, with typical oral suspension pH ranges of 7.4-8.4.

As used herein, "solvent/co-solvent" refers to liquids effective in dissolving and/or enhancing solubility of the substances present in the oral liquid suspension. Water is typically primary; co-solvents (e.g., propylene glycol, polyethylene glycol 400) improve solubility. Concentrations are limited by toxicity thresholds (e.g., propylene glycol ≤5% in pediatrics).

As used herein, "suspending/thickening agent" refers to polymers (e.g., carboxymethylcellulose sodium, xanthan gum) used for preventing particle settling by increasing viscosity. When used, they impart pseudoplastic flow for easy redispersion. Concentrations often vary (e.g., xanthan gum: 0.1-1%).

As used herein, "anticaking/flow agent" refers to excipients (e.g., PROSOLV® SMCC 50) effective in improving powder flowability and preventing aggregation during manufacturing. Silicified microcrystalline cellulose enhances compressibility as well as dose uniformity.

As used herein, "flavorant" refers to natural or synthetic additives (e.g., cherry, citrus oils) effective in masking unpleasant tastes. The flavorant is often selected based on patient demographics (e.g., pediatric preferences) and regulatory status (GRAS for oral use).

As used herein, "colorant" refers to pigments or dyes (e.g., FD&C Red No. 40) effective in enhancing visual appeal. Colorants typically comply with regional regulations (e.g., FDA 21 CFR) while aligning with flavor profiles (e.g., red for cherry).

Summary Table of Excipients

| Term | Key Function | Examples | Regulatory Considerations |
|---|---|---|---|
| Preservative | Microbial inhibition | Sodium benzoate, parabens | CPSC/GRAS limits, pH compatibility |
| Sweetener | Taste masking | Sucralose, sorbitol | Non-cariogenic, low-calorie |
| pH Adjuster/ Buffer | Stabilize formulation pH | Phosphate salts, citric acid | USP buffer capacity guidelines |
| Solvent/ Co-Solvent | Enhance API solubility | Propylene glycol, glycerin | Pediatric toxicity thresholds |
| Suspending Agent | Prevent particle settling | Xanthan gum, CMC | Pseudoplastic flow optimization |

-continued

Summary Table of Excipients

| Term | Key Function | Examples | Regulatory Considerations |
|---|---|---|---|
| Anticaking Agent | Improve powder flow | PROSOLV® SMCC 50 | USP <1174> flow properties |
| Flavorant | Palatability enhancement | Cherry, peppermint oil | GRAS status, allergen-free |
| Colorant | Aesthetic appeal | FD&C dyes, caramel | 21 CFR compliance, non-migratory |

As used herein, "methylparaben" refers to a compound having the IUPAC name: methyl 4-hydroxybenzoate, CAS No.: 99-76-3, molecular formula: $C_8H_8O_3$, and molar Mass: 152.15 g/mol. Methylparaben is employed as a preservative (paraben ester) with antimicrobial activity against molds and yeasts. Methylparaben is typically used in concentrations of 0.015-0.25% in oral solutions/suspensions. Methylparaben is synergistic with propylparaben.

As used herein, "sodium benzoate" refers to a compound having the IUPAC name: sodium benzoate, CAS No.: 532-32-1, molecular formula: $C_7H_5NaO_2$, and molar mass: 144.10 g/mol. Sodium benzoate is employed as an antimicrobial preservative (E211) effective at pH ≤4.5. Sodium benzoate inhibits bacteria/fungi via intracellular acidification. Sodium benzoate is typically used in 0.03-0.1%.

As used herein, "saccharin sodium dihydrate" refers to a compound having the IUPAC name: sodium 1,1-dioxo-1,2-benzothiazol-3-ide-3-olate dihydrate, CAS No.: 6155-57-3, molecular formula: $C_7H_9NNaO_5S$, and molar mass: 242.21 g/mol. Saccharin sodium dihydrate is a non-nutritive sweetener (300-500× sweeter than sucrose). Saccharin sodium dihydrate provides 0.1-0.3% sweetness.

As used herein, "sodium phosphate dibasic" or "$Na_2HPO_4$" refers to the compound having the CAS No.: 7558-79-4, formula: $HNa_2O_4P$, and molar mass: 141.96 g/mol. As used herein, "sodium phosphate monobasic" or "$NaH_2PO_4$" refers to the compound having the CAS No.: 7558-80-7, molecular formula: $H_2NaO_4P$, and molar mass: 119.98 g/mol. These are buffering agents (pH 7.4-8.4), typically used for stability and solubility. Dibasic ($Na_2HPO_4$) and monobasic ($NaH_2PO_4$) are typically combined to resist pH shifts. They are often used in 0.1-0.5% concentrations.

As used herein, "sorbitol" refers to the compound having the IUPAC name: (2S,3R,4R,5R)-hexane-1,2,3,4,5,6-hexol, CAS No.: 50-70-4, molecular formula: $C_6H_{14}O_6$, and molar mass: 182.17 g/mol. Sorbitol is a humectant/sweetener (60% sweetness of sucrose). Sorbitol may also effectively prevent crystallization and retain moisture.

As used herein, "propylene glycol" refers to the compound having the IUPAC name: propane-1,2-diol, CAS No.: 57-55-6, molecular formula: $C_3H_8O_2$, and molar mass: 76.09 g/mol.

Propylene glycol is a co-solvent/humectant. Propylene glycol enhances solubility substances present in the oral liquid suspension and enhances the shelf-life of the oral liquid suspension.

As used herein, "glycerin" or "glycerol" refers to the compound having the IUPAC name: propane-1,2,3-triol, CAS No.: 56-81-5, molecular formula: $C_3H_8O_3$, and molar mass: 92.09 g/mol. Glycerin is effective as a humectant/solvent. Glycerin reduces water activity and prevents microbial growth. Glycerin is synergistic with sorbitol for sweetness.

As used herein, "PROSOLV® SMCC 50 silicified microcrystalline cellulose (98% MCC, 2% colloidal $SiO_2$)" refers to a substance that includes 98% microcrystalline cellulose (MCC; CAS 9004-34-6)+2% colloidal $SiO_2$ (CAS 7631-86-9). PROSOLV® SMCC 50 silicified microcrystalline cellulose can also be referred to as "MCC+$SiO_2$" or "silicified microcrystalline cellulose (2% colloidal $SiO_2$)." PROSOLV® SMCC 50 silicified microcrystalline cellulose is effective as an anticaking/flow agent improving powder compressibility and suspension uniformity. PROSOLV® SMCC 50 silicified microcrystalline cellulose reduces caking in >90% humidity.

As used herein, "carboxymethylcellulose sodium" or "CMC" refers to the compound having the IUPAC name: sodium carboxymethyl cellulose, CAS No.: 9004-32-4, formula: $C_8H_{16}NaO_8$ (monomer), and molar mass: 262.19 g/mol (monomer). CMC is an effective suspending/thickening agent (0.5-2%). CMC forms viscous gels for particle stabilization.

As used herein, "xanthan gum" refers to the substance having the CAS No.: 11138-66-2 and formula: $(C_{35}H_{49}O_{29})_n$ (polymer). Xanthan gum is a pseudoplastic suspending agent (0.1-1%). Shear-thinning viscosity ensures easy redispersion of xanthan gum. Xanthan gum is stable across pH 3-9. Xanthan gum is synergistic with CMC.

As used herein, "cherry flavor" refers to a flavorant effective in masking bitter substances. Cherry flavor (CAS 100-52-7; $C_7H_6O$; 106.12 g/mol) is composed of natural/artificial esters (e.g., benzaldehyde). Cherry flavor has GRAS status; allergen-free variants, and often preferred for pediatric use.

As used herein, "FD&C Red No. 40" refers to the synthetic colorant having the IUPAC name: disodium 6-hydroxy-5-[(2-methoxy-5-methyl-4-sulfophenyl)azo]-2-naphthalenesulfonate, CAS No.: 25956-17-6, formula: $C_{18}H_{14}N_2Na_2O_8S_2$, and molar mass: 496.42 g/mol. The FDA limits its presence to <0.1% in oral formulations.

As used herein, "FD&C Yellow No. 6" refers to the synthetic colorant having the IUPAC name: disodium 6-hydroxy-5-[(4-sulfophenyl)azo]-2-naphthalenesulfonate, CAS No.: 2783-94-0, formula: $C_{16}H_{10}N_2Na_2O_7S_2$, and molar mass: 452.37 g/mol. The FDA limits its presence to <0.1% in oral formulations.

As used herein, "purified water" refers to a primary solvent (CAS No.: 7732-18-5; molar mass: 18.015 g/mol) meeting USP/EP standards for microbial (≤100 CFU/mL) and endotoxin limits. Purified water is typically prepared by removing ions via reverse osmosis/distillation.

As used herein, "polyethylene Glycol 400" or "PEG 400" refers to the substance having the CAS No.: 25322-68-3, formula: $HO(CH_2CH_2O)_nH$ (n≈8-9), and average molar mass: ~400 g/mol. PEG 400 is a co-solvent/viscosity modifier (5-30%). PEG 400 enhances the solubility and mouthfeel of the substances present in the oral liquid suspension.

As used herein, "sucralose" refers to the compound having the IUPAC name: 1,6-dichloro-1,6-dideoxy-β-D-fructofuranosyl-4-chloro-4-deoxy-α-D-galactopyranoside, CAS No.: 56038-13-2, molecular formula: $C_{12}H_{19}Cl_3O_8$, and molar mass: 397.64 g/mol. Sucralose is a high-intensity sweetener (600× sucrose). Sucralose is non-cariogenic, stable at pH 2-8, with no caloric contribution.

Summary Table of Excipients

| Excipient | Function | Key Attributes/Concentration |
|---|---|---|
| Methylparaben | Preservative | 0.015-0.25%, antifungal |
| Sodium Benzoate | Preservative | 0.03-0.1%, pH-dependent efficacy |
| Saccharin Sodium | Sweetener | 0.1-0.3%, non-nutritive |
| Sodium Phosphates | pH buffer | 0.1-0.5%, dual-component system |
| Sorbitol | Humectant/sweetener | ≤10%, osmotic laxative at >10% |
| Propylene Glycol | Co-solvent | 10-60%, enhances solubility |
| Glycerin | Humectant | 5-20%, synergistic with sorbitol |
| PROSOLV® SMCC 50 | Flow agent | 2% $SiO_2$, prevents caking |
| Carboxymethylcellulose | Suspending agent | 0.5-2%, cationic incompatibility |
| Xanthan Gum | Thickener | 0.1-1%, pseudoplastic flow |
| FD&C Dyes | Colorant | <0.1%, synthetic |
| PEG 400 | Co-solvent | 5-30%, enhances solubility |

In the preparation of the oral liquid suspension, the pharmaceutically acceptable salt of atomoxetine and other ingredients may dissolve or disperse in the solvent, leading to dissociation into their respective anions and cations. While the ionic pairing of the salt may no longer persist post-dissolution, references herein to the inclusion of the salt form in the oral liquid suspension are consistent with standard technical interpretation and accepted practice in the field.

Additionally, during formulation, one or more ingredients (including atomoxetine or its salts) may lose their original physical state (e.g., crystalline or amorphous structure), solvate, or hydrate configuration upon dissolution or dispersion. Nevertheless, descriptions of the oral liquid suspension as containing these forms remain appropriate, as recognized by those skilled in the art, to accurately reflect the initial state of the components prior to formulation.

In specific embodiments, one or more excipients in the oral liquid suspension may serve multiple functional roles. For example, sorbitol and glycerin act as dual-function excipients, serving as both sweeteners and humectants in the formulation.

As used herein, "oral liquid suspension" refers to a biphasic pharmaceutical dosage form for oral administration, comprising one or more active pharmaceutical ingredients (APIs) as finely dispersed insoluble particles uniformly distributed within an aqueous-based liquid vehicle. The suspended particles are stabilized by suspending agents and excipients to maintain a heterogeneous system. Settling of particles may occur over time, necessitating agitation prior to administration to ensure dose uniformity. Oral suspensions are often formulated with sweeteners, flavorants, and colorants to improve palatability, particularly for pediatric and geriatric populations.

In contrast, an "oral liquid solution" is a monophasic, homogeneous dosage form in which one or more APIs are fully dissolved at the molecular or ionic level within a compatible liquid vehicle, yielding an optically clear or translucent preparation. Solutions require no agitation prior to administration due to inherent uniformity and typically enable faster drug absorption, as dissolution in the gastrointestinal tract is unnecessary.

Oral liquid suspensions are distinguished from solutions by the physical state of the API (undissolved particles vs. molecular dissolution), the requirement for agitation to ensure uniformity, and their suitability for APIs with poor solubility or stability in solution. Both forms provide alternatives to solid dosage forms for patients with dysphagia but differ fundamentally in formulation design, stability considerations, and handling protocols.

The term "treating" (and equivalent terms such as "treat," "treated," and "treatment") refers to the administration of an active pharmaceutical ingredient (API) (for example, atomoxetine hydrochloride), or a unit dosage form containing the same (such as an oral solution), to a subject for the purpose of preventing, mitigating, curing, healing, alleviating, relieving, remedying, ameliorating, improving, stabilizing, or otherwise affecting a disease or disorder, or a symptom thereof. By way of example, the disease or disorder may include attention-deficit/hyperactivity disorder (ADHD).

The term "attention deficit hyperactivity disorder" or "ADHD" refers to a neurodevelopmental disorder characterized by inattention, or excessive activity and impulsivity, which are otherwise not appropriate for a person's age. Some individuals with ADHD also display difficulty regulating emotions or problems with executive function. For a diagnosis, the symptoms should appear before a person is 12 years old, be present for more than six months, and cause problems in at least two settings (such as school, home, or recreational activities). In children, problems paying attention may result in poor school performance. Additionally, it is associated with other mental disorders and substance misuse. Although it causes impairment, particularly in modern society, many people with ADHD can have sustained attention for tasks they find interesting or rewarding (known as hyperfocus).

ADHD is divided into three primary subtypes: predominantly inattentive (ADHD-PI or ADHD-I), predominantly hyperactive-impulsive (ADHD-PH or ADHD-HI), and combined type (ADHD-C). The table "DSM-5 symptoms" lists the symptoms for ADHD-I and ADHD-HI. Symptoms which can be better explained by another psychiatric or medical condition, which the individual has, are excluded.

DSM-5 symptoms

| Subtype | Symptoms |
|---|---|
| Inattentive | Most or all of the following symptoms, excluding situations where these symptoms are better explained by another psychiatric or medical condition: Be easily distracted, miss details, forget things, and frequently switch from one activity to another Have difficulty maintaining focus on one task Become bored with a task after only a few minutes, unless doing something they find enjoyable Have difficulty focusing attention on organizing or completing a task Have trouble completing or turning in homework assignments, often losing things (e.g., pencils, toys, assignments) needed to complete tasks or activities |

-continued

| | DSM-5 symptoms |
|---|---|
| Subtype | Symptoms |
| | Appear not to be listening when spoken to |
| | Daydream, become easily confused, and move slowly |
| | Have difficulty processing information as quickly and accurately as others |
| | Struggle to follow instructions |
| | Have trouble understanding details; overlooks details |
| | Most or all of the following symptoms, excluding situations where these symptoms are better explained by another psychiatric or medical condition: |
| | Fidget or squirm a great deal |
| | Talk nonstop |
| Hyperactive-Impulsive | Dash around, touching or playing with anything and everything in sight |
| | Have trouble sitting still during dinner, school, and while doing homework |
| | Be constantly in motion |
| | Have difficulty performing quiet tasks or activities |
| | Be impatient |
| | Blurt out inappropriate comments, show their emotions without restraint, and act without regard for consequences |
| | Have difficulty waiting for things they want or waiting their turn in games |
| | Often interrupt conversations or others' activities |
| Combined | Meet the criteria for both inattentive and hyperactive-impulsive ADHD. |

Specific Ranges, Values, and Embodiments

The specific embodiments describing the ranges and values provided below are for illustration purposes only, and do not otherwise limit the scope of the disclosed subject matter, as defined by the claims.

In specific embodiments, the present invention provides for an oral liquid suspension that includes: atomoxetine, or a pharmaceutically acceptable salt thereof; preservative; sweetener; pH adjuster/buffer; solvent/co-solvent, suspending/thickening agent; anticaking/flow agent; flavorant; and colorant.

In specific embodiments, the preservative includes sodium benzoate and methylparaben.

In specific embodiments, the sweetener includes saccharin sodium dihydrate, sorbitol, and sucralose.

In specific embodiments, the pH adjuster/buffer includes sodium phosphate dibasic and sodium phosphate monobasic.

In specific embodiments, the solvent/co-solvent includes propylene glycol, glycerin, polyethylene glycol 400, and purified water.

In specific embodiments, the suspending/thickening agent includes carboxymethylcellulose sodium and xanthan gum.

In specific embodiments, the anticaking/flow agent includes PROSOLV® SMCC 50 (silicified microcrystalline cellulose).

In specific embodiments, the anticaking/flow agent includes 98% MCC, 2% SiO$_2$.

In specific embodiments, the flavorant includes cherry flavor.

In specific embodiments, the colorant includes FD&C Red No. 40 and FD&C Yellow No. 6.

In specific embodiments, the present invention provides for an oral liquid suspension that includes: atomoxetine, or a pharmaceutically acceptable salt thereof; preservative (sodium benzoate and methylparaben); sweetener (saccharin sodium dihydrate, sorbitol, and sucralose); pH adjuster/buffer (sodium phosphate dibasic and sodium phosphate monobasic); solvent/co-solvent (propylene glycol, glycerin, polyethylene glycol 400, and purified water), suspending/thickening agent (carboxymethylcellulose sodium and xanthan gum); anticaking/flow agent (PROSOLV® SMCC 50 (silicified microcrystalline cellulose)); flavorant (cherry flavor); and colorant (FD&C Red No. 40 and FD&C Yellow No. 6).

In specific embodiments, the preservative includes at least one of sodium benzoate and methylparaben.

In specific embodiments, the preservative includes sodium benzoate and methylparaben.

In specific embodiments, the preservative includes sodium benzoate.

In specific embodiments, the preservative includes methylparaben.

In specific embodiments, the sweetener includes at least one of saccharin sodium dihydrate, sorbitol, and sucralose.

In specific embodiments, the sweetener includes saccharin sodium dihydrate.

In specific embodiments, the sweetener includes sorbitol.

In specific embodiments, the sweetener includes sucralose.

In specific embodiments, the pH adjuster/buffer includes at least one of sodium phosphate dibasic and sodium phosphate monobasic.

In specific embodiments, the pH adjuster/buffer includes sodium phosphate dibasic.

In specific embodiments, the pH adjuster/buffer includes sodium phosphate monobasic.

In specific embodiments, the solvent/co-solvent includes at least one of propylene glycol, glycerin, polyethylene glycol 400, and purified water.

In specific embodiments, the solvent/co-solvent includes propylene glycol.

In specific embodiments, the solvent/co-solvent includes glycerin.

In specific embodiments, the solvent/co-solvent includes polyethylene glycol 400.

In specific embodiments, the solvent/co-solvent includes purified water.

In specific embodiments, the suspending/thickening agent includes at least one of carboxymethylcellulose sodium and xanthan gum.

In specific embodiments, the suspending/thickening agent includes carboxymethylcellulose sodium.

In specific embodiments, the suspending/thickening agent includes xanthan gum.

In specific embodiments, the colorant includes at least one of FD&C Red No. 40 and FD&C Yellow No. 6.

In specific embodiments, the colorant includes FD&C Red No. 40.

In specific embodiments, the colorant includes FD&C Yellow No. 6.

In specific embodiments, the present invention provides for an oral liquid suspension that includes: atomoxetine, or a pharmaceutically acceptable salt thereof; methylparaben; sodium benzoate; saccharin sodium, dihydrate; sodium phosphate dibasic; sodium phosphate monobasic; sorbitol; propylene glycol; glycerin; PROSOLV® SMCC 50 (silicified microcrystalline cellulose); carboxymethylcellulose sodium; xanthan gum; flavoring agent, colorant; purified water; polyethylene glycol 400; and sucralose.

In specific embodiments, the present invention provides for an oral liquid suspension that includes: atomoxetine, or a pharmaceutically acceptable salt thereof; methylparaben; sodium benzoate; saccharin sodium, dihydrate; sodium phosphate dibasic; sodium phosphate monobasic; sorbitol; propylene glycol; glycerin; PROSOLV® SMCC 50 (silicified microcrystalline cellulose); carboxymethylcellulose sodium; xanthan gum; cherry flavor; FD&C Red No. 40; FD&C Yellow No. 6; purified water; polyethylene glycol 400; and sucralose.

In specific embodiments, the present invention provides for an oral liquid suspension that includes 2.2850±0.45 wt. % atomoxetine hydrochloride.

In specific embodiments, the present invention provides for an oral liquid suspension that includes 2.2850±0.25 wt. % atomoxetine hydrochloride.

In specific embodiments, the present invention provides for an oral liquid suspension that includes 2.2850±0.10 wt. % atomoxetine hydrochloride.

In specific embodiments, the present invention provides for an oral liquid suspension that includes 2.2850±0.05 wt. % atomoxetine hydrochloride.

In specific embodiments, the present invention provides for an oral liquid suspension that includes 2.2850±0.025 wt. % atomoxetine hydrochloride.

In specific embodiments, the present invention provides for an oral liquid suspension that includes 2.2850±0.015 wt. % atomoxetine hydrochloride.

In specific embodiments, the present invention provides for an oral liquid suspension that includes 2.2850 wt. % atomoxetine hydrochloride.

In specific embodiments, the present invention provides for an oral liquid suspension that includes 22.85±0.45 mg/ml atomoxetine hydrochloride.

In specific embodiments, the present invention provides for an oral liquid suspension that includes 22.85±0.25 mg/ml atomoxetine hydrochloride.

In specific embodiments, the present invention provides for an oral liquid suspension that includes 22.85±0.22 mg/ml atomoxetine hydrochloride.

In specific embodiments, the present invention provides for an oral liquid suspension that includes 22.85±0.1 mg/ml atomoxetine hydrochloride.

In specific embodiments, the present invention provides for an oral liquid suspension that includes 22.85±0.05 mg/ml atomoxetine hydrochloride.

In specific embodiments, the present invention provides for an oral liquid suspension that includes 22.85±0.025 mg/ml atomoxetine hydrochloride.

In specific embodiments, the present invention provides for an oral liquid suspension that includes 22.85±0.015 mg/ml atomoxetine hydrochloride.

In specific embodiments, the present invention provides for an oral liquid suspension that includes 22.85 mg/ml atomoxetine hydrochloride.

In specific embodiments, the present invention provides for an oral liquid suspension that includes 0.1000±0.05 wt. % methylparaben.

In specific embodiments, the present invention provides for an oral liquid suspension that includes 0.1000±0.01 wt. % methylparaben.

In specific embodiments, the present invention provides for an oral liquid suspension that includes 0.1000±0.005 wt. % methylparaben.

In specific embodiments, the present invention provides for an oral liquid suspension that includes 0.1000 wt. % methylparaben.

In specific embodiments, the present invention provides for an oral liquid suspension that includes 1.00±0.15 mg/ml methylparaben.

In specific embodiments, the present invention provides for an oral liquid suspension that includes 1.00±0.1 mg/ml methylparaben.

In specific embodiments, the present invention provides for an oral liquid suspension that includes 1.00±0.05 mg/ml methylparaben.

In specific embodiments, the present invention provides for an oral liquid suspension that includes 1.00 mg/ml methylparaben.

In specific embodiments, the present invention provides for an oral liquid suspension that includes 0.0300±0.006 wt. % sodium benzoate.

In specific embodiments, the present invention provides for an oral liquid suspension that includes 0.0300±0.003 wt. % sodium benzoate.

In specific embodiments, the present invention provides for an oral liquid suspension that includes 0.0300±0.0015 wt. % sodium benzoate.

In specific embodiments, the present invention provides for an oral liquid suspension that includes 0.0300 wt. % sodium benzoate.

In specific embodiments, the present invention provides for an oral liquid suspension that includes 0.30±0.06 mg/ml sodium benzoate.

In specific embodiments, the present invention provides for an oral liquid suspension that includes 0.30±0.03 mg/ml sodium benzoate.

In specific embodiments, the present invention provides for an oral liquid suspension that includes 0.30±0.015 mg/ml sodium benzoate.

In specific embodiments, the present invention provides for an oral liquid suspension that includes 0.30 mg/ml sodium benzoate.

In specific embodiments, the present invention provides for an oral liquid suspension that includes 0.0750±0.015 wt. % saccharin sodium, dihydrate.

In specific embodiments, the present invention provides for an oral liquid suspension that includes 0.0750±0.007 wt. % saccharin sodium, dihydrate.

In specific embodiments, the present invention provides for an oral liquid suspension that includes 0.0750±0.0035 wt. % saccharin sodium, dihydrate.

In specific embodiments, the present invention provides for an oral liquid suspension that includes 0.0750 wt. % saccharin sodium, dihydrate.

In specific embodiments, the present invention provides for an oral liquid suspension that includes 0.75±0.15 mg/ml saccharin sodium, dihydrate In specific embodiments, the present invention provides for an oral liquid suspension that includes 0.75±0.075 mg/ml saccharin sodium, dihydrate In specific embodiments, the present invention provides for an oral liquid suspension that includes 0.75±0.0375 mg/ml saccharin sodium, dihydrate.

In specific embodiments, the present invention provides for an oral liquid suspension that includes 0.75 mg/ml saccharin sodium, dihydrate.

In specific embodiments, the present invention provides for an oral liquid suspension that includes 1.6000±0.32 wt. % sodium phosphate dibasic.

In specific embodiments, the present invention provides for an oral liquid suspension that includes 1.6000±0.16 wt. % sodium phosphate dibasic.

In specific embodiments, the present invention provides for an oral liquid suspension that includes 1.6000±0.8 wt. % sodium phosphate dibasic.

In specific embodiments, the present invention provides for an oral liquid suspension that includes 1.6000 wt. % sodium phosphate dibasic.

In specific embodiments, the present invention provides for an oral liquid suspension that includes 16.00±3.2 mg/ml sodium phosphate dibasic.

In specific embodiments, the present invention provides for an oral liquid suspension that includes 16.00±1.6 mg/ml sodium phosphate dibasic.

In specific embodiments, the present invention provides for an oral liquid suspension that includes 16.00±0.8 mg/ml sodium phosphate dibasic.

In specific embodiments, the present invention provides for an oral liquid suspension that includes 16.00 mg/ml sodium phosphate dibasic.

In specific embodiments, the present invention provides for an oral liquid suspension that includes 0.2700±0.054 wt. % sodium phosphate monobasic.

In specific embodiments, the present invention provides for an oral liquid suspension that includes 0.2700±0.027 wt. % sodium phosphate monobasic.

In specific embodiments, the present invention provides for an oral liquid suspension that includes 0.2700±0.014 wt. % sodium phosphate monobasic.

In specific embodiments, the present invention provides for an oral liquid suspension that includes 0.2700 wt. % sodium phosphate monobasic.

In specific embodiments, the present invention provides for an oral liquid suspension that includes 2.70±0.540 mg/ml sodium phosphate monobasic.

In specific embodiments, the present invention provides for an oral liquid suspension that includes 2.70±0.270 mg/ml sodium phosphate monobasic.

In specific embodiments, the present invention provides for an oral liquid suspension that includes 2.70±0.140 mg/ml sodium phosphate monobasic.

In specific embodiments, the present invention provides for an oral liquid suspension that includes 2.70 mg/ml sodium phosphate monobasic.

In specific embodiments, the present invention provides for an oral liquid suspension that includes 3.0000±0.6 wt. % of a 70% sorbitol solution.

In specific embodiments, the present invention provides for an oral liquid suspension that includes 3.0000±0.3 wt. % of a 70% sorbitol solution.

In specific embodiments, the present invention provides for an oral liquid suspension that includes 3.0000±0.15 wt. % of a 70% sorbitol solution.

In specific embodiments, the present invention provides for an oral liquid suspension that includes 3.0000 wt. % of a 70% sorbitol solution.

In specific embodiments, the present invention provides for an oral liquid suspension that includes 2.2500±0.5 wt. % propylene glycol.

In specific embodiments, the present invention provides for an oral liquid suspension that includes 2.2500±0.225 wt. % propylene glycol.

In specific embodiments, the present invention provides for an oral liquid suspension that includes 2.2500±0.12 wt. % propylene glycol.

In specific embodiments, the present invention provides for an oral liquid suspension that includes 2.2500 wt. % propylene glycol.

In specific embodiments, the present invention provides for an oral liquid suspension that includes 22.50±4.5 mg/ml propylene glycol In specific embodiments, the present invention provides for an oral liquid suspension that includes 22.50±2.25 mg/ml propylene glycol.

In specific embodiments, the present invention provides for an oral liquid suspension that includes 22.50±1.15 mg/ml propylene glycol In specific embodiments, the present invention provides for an oral liquid suspension that includes 22.50 mg/ml propylene glycol.

In specific embodiments, the present invention provides for an oral liquid suspension that includes 5.0000±1 wt. % glycerin.

In specific embodiments, the present invention provides for an oral liquid suspension that includes 5.0000±0.5 wt. % glycerin.

In specific embodiments, the present invention provides for an oral liquid suspension that includes 5.0000±0.25 wt. % glycerin.

In specific embodiments, the present invention provides for an oral liquid suspension that includes 5.0000 wt. % glycerin.

In specific embodiments, the present invention provides for an oral liquid suspension that includes 50.00±10 mg/ml glycerin.

In specific embodiments, the present invention provides for an oral liquid suspension that includes 50.00±5 mg/ml glycerin.

In specific embodiments, the present invention provides for an oral liquid suspension that includes 50.00±2.5 mg/ml glycerin.

In specific embodiments, the present invention provides for an oral liquid suspension that includes 50.00 mg/ml glycerin.

In specific embodiments, the present invention provides for an oral liquid suspension that includes 1.2600±0.25 wt. % PROSOLV® SMCC 50 (silicified microcrystalline cellulose).

In specific embodiments, the present invention provides for an oral liquid suspension that includes 1.2600±0.126 wt. % PROSOLV® SMCC 50 (silicified microcrystalline cellulose).

In specific embodiments, the present invention provides for an oral liquid suspension that includes 1.2600±0.063 wt. % PROSOLV® SMCC 50 (silicified microcrystalline cellulose).

In specific embodiments, the present invention provides for an oral liquid suspension that includes 1.2600 wt. % PROSOLV® SMCC 50 (silicified microcrystalline cellulose).

In specific embodiments, the present invention provides for an oral liquid suspension that includes 12.60±2.5 mg/ml PROSOLV® SMCC 50 (silicified microcrystalline cellulose).

In specific embodiments, the present invention provides for an oral liquid suspension that includes 12.60±1.26 mg/ml PROSOLV® SMCC 50 (silicified microcrystalline cellulose).

In specific embodiments, the present invention provides for an oral liquid suspension that includes 12.60±0.65 mg/ml PROSOLV® SMCC 50 (silicified microcrystalline cellulose).

In specific embodiments, the present invention provides for an oral liquid suspension that includes 12.60 mg/ml PROSOLV® SMCC 50 (silicified microcrystalline cellulose).

In specific embodiments, the present invention provides for an oral liquid suspension that includes 0.2000±0.04 wt. % carboxymethylcellulose sodium.

In specific embodiments, the present invention provides for an oral liquid suspension that includes 0.2000±0.02 wt. % carboxymethylcellulose sodium.

In specific embodiments, the present invention provides for an oral liquid suspension that includes 0.2000±0.01 wt. % carboxymethylcellulose sodium.

In specific embodiments, the present invention provides for an oral liquid suspension that includes 0.2000 wt. % carboxymethylcellulose sodium.

In specific embodiments, the present invention provides for an oral liquid suspension that includes 2.00±0.4 mg/ml carboxymethylcellulose sodium.

In specific embodiments, the present invention provides for an oral liquid suspension that includes 2.00±0.2 mg/ml carboxymethylcellulose sodium.

In specific embodiments, the present invention provides for an oral liquid suspension that includes 2.00±0.1 mg/ml carboxymethylcellulose sodium.

In specific embodiments, the present invention provides for an oral liquid suspension that includes 2.00 mg/ml carboxymethylcellulose sodium.

In specific embodiments, the present invention provides for an oral liquid suspension that includes 0.2000±0.04 wt. % xanthan gum.

In specific embodiments, the present invention provides for an oral liquid suspension that includes 0.2000±0.02 wt. % xanthan gum.

In specific embodiments, the present invention provides for an oral liquid suspension that includes 0.2000±0.01 wt. % xanthan gum.

In specific embodiments, the present invention provides for an oral liquid suspension that includes 0.2000 wt. % xanthan gum.

In specific embodiments, the present invention provides for an oral liquid suspension that includes 2.00±0.4 mg/ml xanthan gum.

In specific embodiments, the present invention provides for an oral liquid suspension that includes 2.00±0.2 mg/ml xanthan gum.

In specific embodiments, the present invention provides for an oral liquid suspension that includes 2.00±0.1 mg/ml xanthan gum.

In specific embodiments, the present invention provides for an oral liquid suspension that includes 2.00 mg/ml xanthan gum.

In specific embodiments, the present invention provides for an oral liquid suspension that includes 0.2000±0.04 wt. % cherry flavor.

In specific embodiments, the present invention provides for an oral liquid suspension that includes 0.2000±0.02 wt. % cherry flavor.

In specific embodiments, the present invention provides for an oral liquid suspension that includes 0.2000±0.01 wt. % cherry flavor.

In specific embodiments, the present invention provides for an oral liquid suspension that includes 0.2000 wt. % cherry flavor.

In specific embodiments, the present invention provides for an oral liquid suspension that includes 2.00±0.4 mg/ml cherry flavor.

In specific embodiments, the present invention provides for an oral liquid suspension that includes 2.00±0.2 mg/ml cherry flavor.

In specific embodiments, the present invention provides for an oral liquid suspension that includes 2.00±0.1 mg/ml cherry flavor.

In specific embodiments, the present invention provides for an oral liquid suspension that includes 2.00 mg/ml cherry flavor.

In specific embodiments, the present invention provides for an oral liquid suspension that includes 0.2000±0.04 wt. % FD&C Red No. 40.

In specific embodiments, the present invention provides for an oral liquid suspension that includes 0.2000±0.02 wt. % FD&C Red No. 40.

In specific embodiments, the present invention provides for an oral liquid suspension that includes 0.2000±0.01 wt. % FD&C Red No. 40.

In specific embodiments, the present invention provides for an oral liquid suspension that includes 0.2000 wt. % FD&C Red No. 40.

In specific embodiments, the present invention provides for an oral liquid suspension that includes <1 mg/ml FD&C Red No. 40

In specific embodiments, the present invention provides for an oral liquid suspension that includes <0.25 mg/ml FD&C Red No. 40

In specific embodiments, the present invention provides for an oral liquid suspension that includes <0.1 mg/ml FD&C Red No. 40.

In specific embodiments, the present invention provides for an oral liquid suspension that includes 0.02±0.004 mg/ml FD&C Red No. 40.

In specific embodiments, the present invention provides for an oral liquid suspension that includes 0.02±0.002 mg/ml FD&C Red No. 40.

In specific embodiments, the present invention provides for an oral liquid suspension that includes 0.02±0.001 mg/ml FD&C Red No. 40.

In specific embodiments, the present invention provides for an oral liquid suspension that includes 0.02 mg/ml FD&C Red No. 40.

In specific embodiments, the present invention provides for an oral liquid suspension that includes 0.0020±0.0004 wt. % FD&C Yellow No. 6.

In specific embodiments, the present invention provides for an oral liquid suspension that includes 0.0020±0.0002 wt. % FD&C Yellow No. 6.

In specific embodiments, the present invention provides for an oral liquid suspension that includes 0.0020±0.0001 wt. % FD&C Yellow No. 6.

In specific embodiments, the present invention provides for an oral liquid suspension that includes 0.0020 wt. % FD&C Yellow No. 6.

In specific embodiments, the present invention provides for an oral liquid suspension that includes 78.4278±10 wt. % purified water.

In specific embodiments, the present invention provides for an oral liquid suspension that includes 78.4278±7.5 wt. % purified water.

In specific embodiments, the present invention provides for an oral liquid suspension that includes 78.4278±4 wt. % purified water.

In specific embodiments, the present invention provides for an oral liquid suspension that includes 78.4278 wt. % purified water.

In specific embodiments, the present invention provides for an oral liquid suspension that includes 784.28±75 mg/ml purified water.

In specific embodiments, the present invention provides for an oral liquid suspension that includes 784.28±50 mg/ml purified water.

In specific embodiments, the present invention provides for an oral liquid suspension that includes 784.28±25 mg/ml purified water.

In specific embodiments, the present invention provides for an oral liquid suspension that includes 784.28±10 mg/ml purified water.

In specific embodiments, the present invention provides for an oral liquid suspension that includes 784.28 mg/ml purified water.

In specific embodiments, the present invention provides for an oral liquid suspension that includes 5.0000±1 wt. % polyethylene glycol 400.

In specific embodiments, the present invention provides for an oral liquid suspension that includes 5.0000±0.5 wt. % polyethylene glycol 400.

In specific embodiments, the present invention provides for an oral liquid suspension that includes 5.0000±0.25 wt. % polyethylene glycol 400.

In specific embodiments, the present invention provides for an oral liquid suspension that includes 5.0000 wt. % polyethylene glycol 400.

In specific embodiments, the present invention provides for an oral liquid suspension that includes 50.00±10 mg/ml polyethylene glycol 400.

In specific embodiments, the present invention provides for an oral liquid suspension that includes 50.00±5 mg/ml polyethylene glycol 400.

In specific embodiments, the present invention provides for an oral liquid suspension that includes 50.00±2.5 mg/ml polyethylene glycol 400.

In specific embodiments, the present invention provides for an oral liquid suspension that includes 50.00±1 mg/ml polyethylene glycol 400.

In specific embodiments, the present invention provides for an oral liquid suspension that includes 50.00 mg/ml polyethylene glycol 400.

In specific embodiments, the present invention provides for an oral liquid suspension that includes 0.1000±0.05 wt. % sucralose.

In specific embodiments, the present invention provides for an oral liquid suspension that includes 0.1000±0.01 wt. % sucralose.

In specific embodiments, the present invention provides for an oral liquid suspension that includes 0.1000±0.005 wt. % sucralose.

In specific embodiments, the present invention provides for an oral liquid suspension that includes 0.1000 wt. % sucralose.

In specific embodiments, the present invention provides for an oral liquid suspension that includes 1.00±0.2 mg/ml sucralose.

In specific embodiments, the present invention provides for an oral liquid suspension that includes 1.00±0.1 mg/ml sucralose.

In specific embodiments, the present invention provides for an oral liquid suspension that includes 1.00±0.05 mg/ml sucralose.

In specific embodiments, the present invention provides for an oral liquid suspension that includes 1.00 mg/ml sucralose.

In specific embodiments, the present invention provides for an oral liquid suspension that includes the preservative, methylparaben:sodium benzoate, of 2.0:1 to 4.5:1 w/w.

In specific embodiments, the present invention provides for an oral liquid suspension that includes the preservative, methylparaben:sodium benzoate, of 2.25:1 to 4.25:1 w/w.

In specific embodiments, the present invention provides for an oral liquid suspension that includes the preservative, methylparaben:sodium benzoate, of 2.5:1 to 4:1 w/w.

In specific embodiments, the present invention provides for an oral liquid suspension that includes the preservative, methylparaben:sodium benzoate, of 2.75:1 to 3.75:1 w/w.

In specific embodiments, the present invention provides for an oral liquid suspension that includes the preservative, methylparaben:sodium benzoate, of 2.5:1 to 5:1 w/w.

In specific embodiments, the present invention provides for an oral liquid suspension that includes the preservative, methylparaben:sodium benzoate, of 1.5:1 to 4:1 w/w.

In specific embodiments, the oral liquid suspension includes the preservatives sodium benzoate and methylparaben.

In specific embodiments, the oral liquid suspension includes the preservatives sodium benzoate and methylparaben, in a combined amount of 0.1300±0.0260 wt. %.

In specific embodiments, the oral liquid suspension includes the preservatives sodium benzoate and methylparaben, in a combined amount of 0.1300±0.0130 wt. %.

In specific embodiments, the oral liquid suspension includes the preservatives sodium benzoate and methylparaben, in a combined amount of 0.1300±0.0065 wt. %.

In specific embodiments, the oral liquid suspension includes the preservatives sodium benzoate and methylparaben, in a combined amount of 0.1300 wt. %.

In specific embodiments, the oral liquid suspension includes the preservatives sodium benzoate and methylparaben, in a combined amount of 1.3±0.26 mg/ml.

In specific embodiments, the oral liquid suspension includes the preservatives sodium benzoate and methylparaben, in a combined amount of 1.3±0.13 mg/ml.

In specific embodiments, the oral liquid suspension includes the preservatives sodium benzoate and methylparaben, in a combined amount of 1.3±0.065 mg/ml.

In specific embodiments, the oral liquid suspension includes the preservatives sodium benzoate and methylparaben, in a combined amount of 1.3 mg/ml.

In specific embodiments, the oral liquid suspension includes the sweeteners saccharin sodium dihydrate, sorbitol, and sucralose.

In specific embodiments, the oral liquid suspension includes the sweeteners saccharin sodium dihydrate, sorbitol, and sucralose, in a combined amount of 2.275±0.455 wt. %.

In specific embodiments, the oral liquid suspension includes the sweeteners saccharin sodium dihydrate, sorbitol, and sucralose, in a combined amount of 2.275±0.2275 wt. %.

In specific embodiments, the oral liquid suspension includes the sweeteners saccharin sodium dihydrate, sorbitol, and sucralose, in a combined amount of 2.275±0.1138 wt. %.

In specific embodiments, the oral liquid suspension includes the sweeteners saccharin sodium dihydrate, sorbitol, and sucralose, in a combined amount of 2.275 wt. %.

In specific embodiments, the oral liquid suspension includes the sweeteners saccharin sodium dihydrate, sorbitol, and sucralose, in a combined amount of 10.57±2.114 mg/ml.

In specific embodiments, the oral liquid suspension includes the sweeteners saccharin sodium dihydrate, sorbitol, and sucralose, in a combined amount of 10.57±1.057 mg/ml.

In specific embodiments, the oral liquid suspension includes the sweeteners saccharin sodium dihydrate, sorbitol, and sucralose, in a combined amount of 10.57±0.5285 mg/ml.

In specific embodiments, the oral liquid suspension includes the sweeteners saccharin sodium dihydrate, sorbitol, and sucralose, in a combined amount of 10.57 mg/ml.

In specific embodiments, the oral liquid suspension includes the pH adjusters/buffers sodium phosphate dibasic and sodium phosphate monobasic.

In specific embodiments, the oral liquid suspension includes the pH adjusters/buffers sodium phosphate dibasic and sodium phosphate monobasic, in a combined amount of 1.87±0.374 wt. %.

In specific embodiments, the oral liquid suspension includes the pH adjusters/buffers sodium phosphate dibasic and sodium phosphate monobasic, in a combined amount of 1.87±0.187 wt. %.

In specific embodiments, the oral liquid suspension includes the pH adjusters/buffers sodium phosphate dibasic and sodium phosphate monobasic, in a combined amount of 1.87±0.0935 wt. %.

In specific embodiments, the oral liquid suspension includes the pH adjusters/buffers sodium phosphate dibasic and sodium phosphate monobasic, in a combined amount of 1.87 wt. %.

In specific embodiments, the oral liquid suspension includes the pH adjusters/buffers sodium phosphate dibasic and sodium phosphate monobasic, in a combined amount of 18.7±3.74 mg/ml.

In specific embodiments, the oral liquid suspension includes the pH adjusters/buffers sodium phosphate dibasic and sodium phosphate monobasic, in a combined amount of 18.7±1.87 mg/ml.

In specific embodiments, the oral liquid suspension includes the pH adjusters/buffers sodium phosphate dibasic and sodium phosphate monobasic, in a combined amount of 18.7±0.935 mg/ml.

In specific embodiments, the oral liquid suspension includes the pH adjusters/buffers sodium phosphate dibasic and sodium phosphate monobasic, in a combined amount of 18.7 mg/ml.

In specific embodiments, the oral liquid suspension includes the solvents/co-solvents propylene glycol, glycerin, polyethylene glycol 400, and purified water.

In specific embodiments, the oral liquid suspension includes the solvents/co-solvents propylene glycol, glycerin, polyethylene glycol 400, and purified water, in a combined amount of 90.6778±5 wt. %.

In specific embodiments, the oral liquid suspension includes the solvents/co-solvents propylene glycol, glycerin, polyethylene glycol 400, and purified water, in a combined amount of 90.6778±4 wt. %.

In specific embodiments, the oral liquid suspension includes the solvents/co-solvents propylene glycol, glycerin, polyethylene glycol 400, and purified water, in a combined amount of 90.6778±3 wt. %.

In specific embodiments, the oral liquid suspension includes the solvents/co-solvents propylene glycol, glycerin, polyethylene glycol 400, and purified water, in a combined amount of 90.6778±2 wt. %.

In specific embodiments, the oral liquid suspension includes the solvents/co-solvents propylene glycol, glycerin, polyethylene glycol 400, and purified water, in a combined amount of 90.6778±1 wt. %.

In specific embodiments, the oral liquid suspension includes the solvents/co-solvents propylene glycol, glycerin, polyethylene glycol 400, and purified water, in a combined amount of 90.6778 wt. %.

In specific embodiments, the oral liquid suspension includes the solvents/co-solvents propylene glycol, glycerin, polyethylene glycol 400, and purified water, in a combined amount of 906.78±50 mg/ml.

In specific embodiments, the oral liquid suspension includes the solvents/co-solvents propylene glycol, glycerin, polyethylene glycol 400, and purified water, in a combined amount of 906.78±40 mg/ml.

In specific embodiments, the oral liquid suspension includes the solvents/co-solvents propylene glycol, glycerin, polyethylene glycol 400, and purified water, in a combined amount of 906.78±30 mg/ml.

In specific embodiments, the oral liquid suspension includes the solvents/co-solvents propylene glycol, glycerin, polyethylene glycol 400, and purified water, in a combined amount of 906.78±10 mg/ml.

In specific embodiments, the oral liquid suspension includes the solvents/co-solvents propylene glycol, glycerin, polyethylene glycol 400, and purified water, in a combined amount of 906.78±10 mg/ml.

In specific embodiments, the oral liquid suspension includes the solvents/co-solvents propylene glycol, glycerin, polyethylene glycol 400, and purified water, in a combined amount of 906.78±5 mg/ml.

In specific embodiments, the oral liquid suspension includes the solvents/co-solvents propylene glycol, glycerin, polyethylene glycol 400, and purified water, in a combined amount of 906.78 mg/ml.

In specific embodiments, the oral liquid suspension includes the suspending/thickening agents carboxymethylcellulose sodium and xanthan gum.

In specific embodiments, the oral liquid suspension includes the suspending/thickening agents carboxymethylcellulose sodium and xanthan gum, in a combined amount of 0.4±0.08 wt. %.

In specific embodiments, the oral liquid suspension includes the suspending/thickening agents carboxymethylcellulose sodium and xanthan gum, in a combined amount of 0.4±0.04 wt. %.

In specific embodiments, the oral liquid suspension includes the suspending/thickening agents carboxymethylcellulose sodium and xanthan gum, in a combined amount of 0.4±0.02 wt. %.

In specific embodiments, the oral liquid suspension includes the suspending/thickening agents carboxymethylcellulose sodium and xanthan gum, in a combined amount of 0.4 wt. %.

In specific embodiments, the oral liquid suspension includes the colorants FD&C Red No. 40 and FD&C Yellow No. 6.

In specific embodiments, the oral liquid suspension includes the colorants FD&C Red No. 40 and FD&C Yellow No. 6, in a combined amount of 0.0022±0.00044 wt. %.

In specific embodiments, the oral liquid suspension includes the colorants FD&C Red No. 40 and FD&C Yellow No. 6, in a combined amount of 0.0022±0.00022 wt. %.

In specific embodiments, the oral liquid suspension includes the colorants FD&C Red No. 40 and FD&C Yellow No. 6, in a combined amount of 0.0022±0.00011 wt. %.

In specific embodiments, the oral liquid suspension includes the colorants FD&C Red No. 40 and FD&C Yellow No. 6, in a combined amount of 0.0022 wt. %.

In specific embodiments, the oral liquid suspension includes the colorants FD&C Red No. 40 and FD&C Yellow No. 6, in a combined amount of 0.02±0.004 mg/ml.

In specific embodiments, the oral liquid suspension includes the colorants FD&C Red No. 40 and FD&C Yellow No. 6, in a combined amount of 0.02±0.002 mg/ml.

In specific embodiments, the oral liquid suspension includes the colorants FD&C Red No. 40 and FD&C Yellow No. 6, in a combined amount of 0.02±0.001 mg/ml.

In specific embodiments, the oral liquid suspension includes the colorants FD&C Red No. 40 and FD&C Yellow No. 6, in a combined amount of 0.02 mg/ml.

In specific embodiments, the oral liquid suspension includes preservative, in a combined amount of 0.1300±0.0260 wt. %.

In specific embodiments, the oral liquid suspension includes preservative, in a combined amount of 0.1300±0.0130 wt. %.

In specific embodiments, the oral liquid suspension includes preservative, in a combined amount of 0.1300±0.0065 wt. %.

In specific embodiments, the oral liquid suspension includes preservative, in a combined amount of 0.1300 wt. %.

In specific embodiments, the oral liquid suspension includes preservative, in a combined amount of 1.3±0.26 mg/ml.

In specific embodiments, the oral liquid suspension includes preservative, in a combined amount of 1.3±0.13 mg/ml.

In specific embodiments, the oral liquid suspension includes preservative, in a combined amount of 1.3±0.065 mg/ml.

In specific embodiments, the oral liquid suspension includes preservative, in a combined amount of 1.3 mg/ml.

In specific embodiments, the oral liquid suspension includes sweetener, in a combined amount of 2.275±0.455 wt. %.

In specific embodiments, the oral liquid suspension includes sweetener, in a combined amount of 2.275±0.2275 wt. %.

In specific embodiments, the oral liquid suspension includes sweetener, in a combined amount of 2.275±0.1138 wt. %.

In specific embodiments, the oral liquid suspension includes sweetener, in a combined amount of 2.275 wt. %.

In specific embodiments, the oral liquid suspension includes sweetener, in a combined amount of 10.57±2.114 mg/ml.

In specific embodiments, the oral liquid suspension includes sweetener, in a combined amount of 10.57±1.057 mg/ml.

In specific embodiments, the oral liquid suspension includes sweetener, in a combined amount of 10.57±0.5285 mg/ml.

In specific embodiments, the oral liquid suspension includes sweetener, in a combined amount of 10.57 mg/ml.

In specific embodiments, the oral liquid suspension includes pH adjuster/buffer, in a combined amount of 1.87±0.374 wt. %.

In specific embodiments, the oral liquid suspension includes pH adjuster/buffer, in a combined amount of 1.87±0.187 wt. %.

In specific embodiments, the oral liquid suspension includes pH adjuster/buffer, in a combined amount of 1.87±0.0935 wt. %.

In specific embodiments, the oral liquid suspension includes pH adjuster/buffer, in a combined amount of 1.87 wt. %.

In specific embodiments, the oral liquid suspension includes pH adjuster/buffer, in a combined amount of 18.7±3.74 mg/ml.

In specific embodiments, the oral liquid suspension includes pH adjuster/buffer, in a combined amount of 18.7±1.87 mg/ml.

In specific embodiments, the oral liquid suspension includes pH adjuster/buffer, in a combined amount of 18.7±0.935 mg/ml.

In specific embodiments, the oral liquid suspension includes pH adjuster/buffer, in a combined amount of 18.7 mg/ml.

In specific embodiments, the oral liquid suspension includes solvent/co-solvent, in a combined amount of 90.6778±5 wt. %.

In specific embodiments, the oral liquid suspension includes solvent/co-solvent, in a combined amount of 90.6778±4 wt. %.

In specific embodiments, the oral liquid suspension includes solvent/co-solvent, in a combined amount of 90.6778±3 wt. %.

In specific embodiments, the oral liquid suspension includes solvent/co-solvent in a combined amount of 90.6778±2 wt. %.

In specific embodiments, the oral liquid suspension includes solvent/co-solvent, in a combined amount of 90.6778±1 wt. %.

In specific embodiments, the oral liquid suspension includes solvent/co-solvent, in a combined amount of 90.6778 wt. %.

In specific embodiments, the oral liquid suspension includes solvent/co-solvent, in a combined amount of 906.78±50 mg/ml.

In specific embodiments, the oral liquid suspension includes solvent/co-solvent, in a combined amount of 906.78±40 mg/ml.

In specific embodiments, the oral liquid suspension includes solvent/co-solvent, in a combined amount of 906.78±30 mg/ml.

In specific embodiments, the oral liquid suspension includes solvent/co-solvent, in a combined amount of 906.78±10 mg/ml.

In specific embodiments, the oral liquid suspension includes solvent/co-solvent, in a combined amount of 906.78±10 mg/ml.

In specific embodiments, the oral liquid suspension includes solvent/co-solvent, in a combined amount of 906.78±5 mg/ml.

In specific embodiments, the oral liquid suspension includes solvent/co-solvent, in a combined amount of 906.78 mg/ml.

In specific embodiments, the oral liquid suspension includes suspending/thickening agent, in a combined amount of 0.4±0.08 wt. %.

In specific embodiments, the oral liquid suspension includes suspending/thickening agent, in a combined amount of 0.4±0.04 wt. %.

In specific embodiments, the oral liquid suspension includes suspending/thickening agent, in a combined amount of 0.4±0.02 wt. %.

In specific embodiments, the oral liquid suspension includes the suspending/thickening agent, in a combined amount of 0.4 wt. %.

In specific embodiments, the oral liquid suspension includes anticaking/flow agent, in a combined amount of 1.2600±0.252 wt. %.

In specific embodiments, the oral liquid suspension includes anticaking/flow agent, in a combined amount of 1.2600±0.1260 wt. %.

In specific embodiments, the oral liquid suspension includes anticaking/flow agent, in a combined amount of 1.2600±0.063 wt. %.

In specific embodiments, the oral liquid suspension includes anticaking/flow agent, in a combined amount of 1.2600 wt. %.

In specific embodiments, the oral liquid suspension includes anticaking/flow agent, in a combined amount of 12.60±2.52 mg/ml.

In specific embodiments, the oral liquid suspension includes anticaking/flow agent, in a combined amount of 12.60±1.26 mg/ml.

In specific embodiments, the oral liquid suspension includes anticaking/flow agent, in a combined amount of 12.60 mg/ml.

In specific embodiments, the oral liquid suspension includes flavorant, in a combined amount of 0.2000±0.040 wt. %.

In specific embodiments, the oral liquid suspension includes flavorant, in a combined amount of 0.2000±0.020 wt. %.

In specific embodiments, the oral liquid suspension includes flavorant, in a combined amount of 0.2000±0.010 wt. %.

In specific embodiments, the oral liquid suspension includes flavorant, in a combined amount of 0.2000 wt. %.

In specific embodiments, the oral liquid suspension includes flavorant, in a combined amount of 2.00±0.40 mg/ml.

In specific embodiments, the oral liquid suspension includes flavorant, in a combined amount of 2.00±0.20 mg/ml.

In specific embodiments, the oral liquid suspension includes flavorant, in a combined amount of 2.00±0.10 mg/ml.

In specific embodiments, the oral liquid suspension includes flavorant, in a combined amount of 2.00 mg/ml.

In specific embodiments, the oral liquid suspension includes the colorants FD&C Red No. 40 and FD&C Yellow No. 6.

In specific embodiments, the oral liquid suspension includes colorant, in a combined amount of 0.0022±0.00044 wt. %.

In specific embodiments, the oral liquid suspension includes colorant, in a combined amount of 0.0022±0.00022 wt. %.

In specific embodiments, the oral liquid suspension includes colorant, in a combined amount of 0.0022±0.00011 wt. %.

In specific embodiments, the oral liquid suspension includes colorant, in a combined amount of 0.0022 wt. %.

In specific embodiments, the oral liquid suspension includes colorant, in a combined amount of 0.02±0.004 mg/ml.

In specific embodiments, the oral liquid suspension includes colorant, in a combined amount of 0.02±0.002 mg/ml.

In specific embodiments, the oral liquid suspension includes colorant, in a combined amount of 0.02±0.001 mg/ml.

In specific embodiments, the oral liquid suspension includes colorant, in a combined amount of 0.02 mg/ml.

In specific embodiments, the oral liquid suspension is contained within an 8 ounce high-density polyethylene bottle with a child resistant polypropylene (PP) closure.

In specific embodiments, the oral liquid suspension is packaged in a high-density polyethylene bottle with child-resistant polypropylene closure, wherein: (a) leachables remain ≤0.1 ppm over 24 months storage at 25° C./60% RH; and (b) ≥95% preservative potency (methylparaben+sodium benzoate) is maintained under said storage conditions.

In specific embodiments, the oral liquid suspension has a pH of 6.4-8.1.

In specific embodiments, the oral liquid suspension has a pH of 6.5-8.0.

In specific embodiments, the oral liquid suspension has a pH of 6.75-7.75.

In specific embodiments, the oral liquid suspension has a viscosity of 130-270 mPa·s.

In specific embodiments, the oral liquid suspension has a viscosity of 140-260 mPa·s.

In specific embodiments, the oral liquid suspension has a viscosity of 150-250 mPa·s.

In specific embodiments, the oral liquid suspension has a viscosity of 160-240 mPa·s.

In specific embodiments, the oral liquid suspension has a viscosity of 170-230 mPa·s.

In specific embodiments, the oral liquid suspension has a specific gravity of 0.950-1.250.

In specific embodiments, the oral liquid suspension has a specific gravity of 1.000-1.250.

In specific embodiments, the oral liquid suspension has a specific gravity of 1.000-1.200.

In specific embodiments, In specific embodiments, the oral liquid suspension has a specific gravity of 1.020-1.180.

In specific embodiments, the oral liquid suspension has a particle size distribution of $d_{10}$<35 μm.

In specific embodiments, the oral liquid suspension has a particle size distribution of $d_{10}$<30 μm.

In specific embodiments, the oral liquid suspension has a particle size distribution of $d_{10}<27.5$ μm.

In specific embodiments, the oral liquid suspension has a particle size distribution of $d_{10}<25$ μm.

In specific embodiments, the oral liquid suspension has a particle size distribution of $d_{10}<20$ μm.

In specific embodiments, the oral liquid suspension has a particle size distribution of $d_{50}<110$ μm.

In specific embodiments, the oral liquid suspension has a particle size distribution of $d_{50}<100$ μm.

In specific embodiments, the oral liquid suspension has a particle size distribution of $d_{50}<90$ μm.

In specific embodiments, the oral liquid suspension has a particle size distribution of $d_{50}<80$ μm.

In specific embodiments, the oral liquid suspension has a particle size distribution of $d_{50}<70$ μm.

In specific embodiments, the oral liquid suspension has a particle size distribution of $d_{90}<310$ μm.

In specific embodiments, the oral liquid suspension has a particle size distribution of $d_{90}<300$ μm.

In specific embodiments, the oral liquid suspension has a particle size distribution of $d_{90}<290$ μm.

In specific embodiments, the oral liquid suspension has a particle size distribution of $d_{90}<280$ μm.

In specific embodiments, the oral liquid suspension has a particle size distribution of $d_{90}<270$ μm.

In specific embodiments, the oral liquid suspension has a particle size distribution of $d_{90}<260$ μm.

In specific embodiments, the oral liquid suspension has a particle size distribution of $d_{10}<35$ μm; $d_{50}<120$ μm; and $d_{90}<320$ μm.

In specific embodiments, the oral liquid suspension has a particle size distribution of $d_{10}<32.5$ μm; $d_{50}<110$ μm; and $d_{90}<310$ μm.

In specific embodiments, the oral liquid suspension has a particle size distribution of $d_{10}<30$ μm; $d_{50}<100$ μm; and $d_{90}<300$ μm.

In specific embodiments, the oral liquid suspension has a particle size distribution of $d_{10}<27.5$ μm; $d_{50}<90$ μm; and $d_{90}<290$ μm.

In specific embodiments, the oral liquid suspension has a particle size distribution of $d_{10}<25$ μm; $d_{50}<80$ μm; and $d_{90}<280$ μm.

In specific embodiments, the oral liquid suspension has a particle size distribution of $d_{10}<22.5$ μm; $d_{50}<70$ μm; and $d_{90}<270$ μm.

In specific embodiments, the oral liquid suspension has redispersibility characterized by ≥40% resuspension within 30 s.

In specific embodiments, the oral liquid suspension has redispersibility characterized by ≥50% resuspension within 30 s.

In specific embodiments, the oral liquid suspension has redispersibility characterized by ≥60% resuspension within 30 s.

In specific embodiments, the oral liquid suspension has redispersibility characterized by ≥70% resuspension within 30 s.

In specific embodiments, the oral liquid suspension has redispersibility characterized by ≥80% resuspension within 30 s.

In specific embodiments, the oral liquid suspension has redispersibility characterized by ≥90% resuspension within 30 s.

In specific embodiments, the oral liquid suspension has redispersibility characterized by: (a) sedimentation volume ≤40 mL per 50 mL suspension after 24 hr static storage at 25° C.; and (b) ≥50% particle resuspension within 30 seconds of manual shaking, as measured per ICH Q6A guidelines.

In specific embodiments, the oral liquid suspension has redispersibility that achieves uniform dispersion within ≤15 seconds of mechanical agitation (60 RPM) after 6 months accelerated storage at 40° C./75% RH.

In specific embodiments, the oral liquid suspension has a redispersibility, complying with USP <601> redispersibility criteria: ≥90% of settled particles resuspend within 30 seconds of manual shaking, with no caking observed.

In specific embodiments, the oral liquid suspension has redispersibility wherein redispersed particles maintain $d_{90}<300$ m after 24 hr sedimentation, verified by laser diffraction (USP <429>).

In specific embodiments, the oral liquid suspension has redispersibility exhibiting surface tension of 54.5-72.5 mN/m measured via Du Noüy ring method, correlating with ≥85% redispersibility index.

In specific embodiments, the oral liquid suspension has redispersibility, wherein homogenization parameters (IKA Ultra-Turrax T25 S1 at 8,000-12,000 RPM for ≤30 min) enable ≥95% particle separation efficiency post-sedimentation.

In specific embodiments, the oral liquid suspension has redispersibility, retaining ≥75% redispersibility after 24 months at 25° C./60% RH, confirmed by sedimentation volume ≤40 mL and $d_{90}<300$ μm.

In specific embodiments, the oral liquid suspension includes PROSOLV® SMCC 50 at 1.26% w/w, providing carrier-to-API weight ratio of 1:1.8 to prevent nanoparticle agglomeration (RDI ≥95%).

In specific embodiments, the oral liquid suspension exhibits synergistic antimicrobial efficacy characterized by: (a) a log reduction value of ≥3.8 for *Escherichia coli, Pseudomonas aeruginosa, Staphylococcus aureus*, and *Candida albicans* at pH 7.2-7.6 after 14 and 28 days of storage; (b) a log reduction value of ≥3.6 for *Burkholderia cepacia* without benzoic acid crystallization after 14 and 28 days of storage; and (c) a log reduction value of ≥1.8 for *Aspergillus brasiliensis* despite sorbitol-induced water activity ≤0.95 after 14 days and ≥1.9 after 28 days of storage; wherein ≥50% redispersibility is retained under 6 months accelerated storage at 40° C./75% RH.

In specific embodiments, the oral liquid suspension exhibits antimicrobial efficacy with: (a) methylparaben at 0.08-0.12% w/w and sodium benzoate at 0.025-0.035% w/w; (b) a preservative ratio (methylparaben:sodium benzoate) of 2.5:1 to 4:1 w/w; and (c) compliance with USP <51> antimicrobial effectiveness testing criteria for Category 1 products (oral aqueous formulations), demonstrating no microbial recovery ≥1.0 $\log_{10}$ CFU/mL for bacteria and ≥0.5 $\log_{10}$ CFU/mL for fungi after 28 days.

In specific embodiments, the oral liquid suspension exhibits the antimicrobial efficacy: (a) 4.0 log reduction against *Klebsiella pneumoniae* (ATCC 4352) and *Enterococcus faecalis* (ATCC 29212) after 14 days at pH 7.4±0.2; (b) ≤0.3% benzoic acid crystallization after 24 months at 25° C./60% RH; and (c) water activity (a_w) ≤0.92 measured via capacitive hygrometer (USP <922>), inhibiting osmophilic fungal growth.

In specific embodiments, the oral liquid suspension exhibits antimicrobial efficacy, wherein the antimicrobial efficacy persists for ≥24 months under ambient storage (25° C./60% RH), as evidenced by: (a) ≤0.5 $\log_{10}$ CFU/mL increase in USP <61> microbial limits testing for total aerobic count; (b) absence of *Burkholderia cepacia* complex (BCC) per FDA BAM Chapter 23; and (c) retained pseudoplastic flow (thixotropic index 1.8-2.2) ensuring ≥85% redispersibility within 15 seconds of manual shaking.

In specific embodiments, the oral liquid suspension exhibits antimicrobial efficacy, wherein the log reduction values correlate with preservative efficacy kinetics defined by: (a) ≥2.0 log reduction within 6 hours against *Staphylococcus aureus* (ATCC 6538) and *Candida albicans* (ATCC 10231); (b) ≥3.0 log reduction within 24 hours against *Pseudomonas aeruginosa* (ATCC 9027); and (c) time-kill assay results (ASTM E2315) showing bactericidal activity (≥3 log reduction) and fungistatic activity (≤0.5 log increase) over 28 days.

In specific embodiments, the oral liquid suspension exhibits bioequivalence to Strattera® capsules under fasting conditions as demonstrated in a crossover study, wherein: (a) geometric mean ratios (T/R) for Cmax and AUCt are 104.05% and 99.28%, respectively, with 90% confidence intervals of 93.76-115.47% and 95.83-102.86%; (b) median Tmax ranges from 1.5 to 3.5 hours post-administration, consistent with the reference product's pharmacokinetic profile; (c) terminal elimination half-life (t½) aligns with cytochrome P450 2D6 polymorphism: 3.2-5.1 hours in extensive metabolizers (EMs) and 18.2-24.9 hours in poor metabolizers (PMs); (d) dose proportionality is maintained across 10-100 mg doses, as evidenced by linear regression (R2≥0.98) of AUC versus administered quantity; and (e) bioavailability metrics match Strattera® capsules' established profile of ≥90% relative exposure in PMs versus EMs.

In specific embodiments, the oral liquid suspension exhibits bioequivalence under fed conditions, characterized by: (a) geometric mean ratios (T/R) for Cmax and AUCt are 104.05% and 99.28%, respectively, with 90% confidence intervals of 93.76-115.47% and 95.83-102.86%; (b) median Tmax ranges from 1.5 to 3.5 hours post-administration, consistent with the reference product's pharmacokinetic profile; (c) terminal elimination half-life (t½) aligns with cytochrome P450 2D6 polymorphism: 3.2-5.1 hours in extensive metabolizers (EMs) and 18.2-24.9 hours in poor metabolizers (PMs); (d) dose proportionality is maintained across 10-100 mg doses, as evidenced by linear regression (R2≥0.98) of AUC versus administered quantity; and (e) bioavailability metrics match Strattera® capsules' established profile of ≥90% relative exposure in PMs versus EMs.

In specific embodiments, comparative dissolution testing per USP <711> of the oral liquid suspension demonstrates: (a) geometric mean ratios (T/R) for Cmax and AUCt of 98.3-106.7% and 97.5-103.9%, respectively, with 90% confidence intervals fully within 90-111%; (b) median Tmax delay of ≤0.5 hours compared to fasting conditions (1.5-4.0 hours post-administration); (c) dose-normalized $AUC_{0-\infty}$ variability ≤15% across 10-100 mg doses, as per FDA bioequivalence guidance for high-variability drugs.

In specific embodiments, comparative dissolution testing per USP <711> demonstrates: (a) ≥85% atomoxetine release within 15 minutes using paddle apparatus (50 RPM) in 900 mL pH 4.5 acetate buffer; (b) similarity factor (f2) ≥75 relative to Strattera® capsules across pH 1.2-6.8 media; (c) dissolution profile stability over 24 months at 25° C./60% RH, with ≤5% deviation from initial release rates.

In specific embodiments, the oral liquid suspension achieves ≥92% taste acceptance in pediatric cohorts (ages 6-17), as evidenced by: (a) ≤7.1% subjects reporting difficulty with daily administration in a 150-patient palatability study; (b) 78% reduction in bitterness scores versus unflavored comparator (p<0.001, VAS scale); (c) adherence rates ≥95% in 12-week ADHD trials, correlating with flavor-masking efficacy ($R^2$=0.89).

In specific embodiments, the oral liquid suspension maintains bioequivalence over 24 months storage at 25° C./60% RH, wherein: (a) Cmax and AUCt geometric mean ratios remain within 95-105% of initial values; (b) ≤10% increase in Tmax variability (1.5-3.8 hours); and (c) preservative efficacy retains USP <51> compliance, with log reductions 3.8 against *E. coli* and *S. aureus* after 28-day microbial challenge.

In specific embodiments, the oral liquid suspension exhibits ≤0.3% benzoic acid crystallization after 24 months at 25° C./60% RH.

In specific embodiments, the oral liquid suspension is administered to a child, under 18 years of age.

In specific embodiments, the oral liquid suspension is administered to a child, under 16 years of age.

In specific embodiments, the oral liquid suspension is administered to a child, under 12 years of age.

In specific embodiments, the oral liquid suspension is administered to a child, under 8 years of age.

In specific embodiments, the oral liquid suspension is administered to a child, 2-18 years of age.

In specific embodiments, the oral liquid suspension is administered to a child, 5-18 years of age.

In specific embodiments, the oral liquid suspension is administered to a child, 8-18 years of age.

In specific embodiments, the oral liquid suspension is administered to a child, 2-17 years of age.

In specific embodiments, the oral liquid suspension is administered to a child, 5-17 years of age.

In specific embodiments, the oral liquid suspension is administered to a child, 8-17 years of age.

In specific embodiments, the atomoxetine, or pharmaceutically acceptable salt thereof, is administered in 0.40-1.50 mg/kg/day.

In specific embodiments, the atomoxetine, or pharmaceutically acceptable salt thereof, is administered in 0.45-1.45 mg/kg/day.

In specific embodiments, the atomoxetine, or pharmaceutically acceptable salt thereof, is administered in 0.5-1.4 mg/kg/day.

In specific embodiments, the atomoxetine, or pharmaceutically acceptable salt thereof, is administered in 0.55-1.35 mg/kg/day.

In specific embodiments, the atomoxetine, or pharmaceutically acceptable salt thereof, is administered in 0.60-1.30 mg/kg/day.

In specific embodiments, the oral liquid suspension exhibits the geometric mean ratio (T/R) for Cmax of atomoxetine ranges from 0.945 to 1.03 when compared to Strattera® capsules under fasting conditions.

In specific embodiments, the oral liquid suspension exhibits the geometric mean ratio (T/R) for $AUC_{0-last}$ of atomoxetine ranges from 1.00 to 1.07 when compared to Strattera® capsules under fasting conditions.

In specific embodiments, the oral liquid suspension exhibits (a) the geometric mean ratio (T/R) for Cmax of atomoxetine is 0.945-1.03; and (b) the geometric mean ratio (T/R) for $AUC_{0-last}$ of atomoxetine is 1.00-1.07.

In specific embodiments, the oral liquid suspension achieves bioequivalence with Strattera® oral capsules, as defined by a geometric mean ratio of 0.945 to 1.03 for $C_{max}$ and 1.00 to 1.07 for $AUC_{0-last}$.

All publications, patents, and patent applications referred to herein are incorporated by reference in their entirety to the same extent as if each individual publication, patent, or patent application was specifically and individually indicated to be incorporated by reference in its entirety.

The following examples are set forth to further illustrate the presently disclosed subject matter (e.g., oral soluble films, methods of using the same, and methods of preparing the same). The below examples, however, should not be construed as limiting in any manner the present invention, as set forth in the claims.

EXAMPLES

Example 1: Batch Formulation a. The packaging components in the 236 mL package configuration is described in Table 2.

TABLE 2

| | Container and Closure | |
|---|---|---|
| ITEM # | COMPONENT | DESCRIPTION |
| 1. | CONTAINER | 8 oz OBLONG, BLAKE 28-400 CT HDPE, EBM |
| 2. | CLOSURE | 28 mm CRC MOLD-RITE PLASTICS |

Example 1 details the precise composition and manufacturing scale of the atomoxetine hydrochloride 20 mg/mL oral suspension. The formulation combines atomoxetine hydrochloride (22.85 mg/mL) with 17 functional excipients across preservatives (methylparaben, sodium benzoate), sweeteners (saccharin sodium, sorbitol, sucralose), pH buffers (sodium phosphate dibasic/monobasic), suspending agents (carboxymethylcellulose sodium, xanthan gum, PROSOLV® SMCC 50), and co-solvents/humectants (pro-

TABLE 1

Batch Formulation
Atomoxetine Oral Suspension, 20 mg/mL
(Each mL contains atomoxetine hydrochloride
equivalent to 20 mg of atomoxetine)

| ITEM # | BATCH CONC. (% W/W) | MATERIAL/ COMPONENT | GRADE | QUANTITY PER 1 ML (MG) | QUANTITY PER 15 L BATCH (G) |
|---|---|---|---|---|---|
| 1 | 2.2850 | Atomoxetine Hydrochloride | USP | 22.85 | 342.75 |
| 2 | 0.1000 | Methylparaben | NF | 1.00 | 15.00 |
| 3 | 0.0300 | Sodium Benzoate, Powder | NF | 0.30 | 4.50 |
| 4 | 0.0750 | Saccharin Sodium, Dihydrate, Powder | USP | 0.75 | 11.25 |
| 5 | 1.6000 | Sodium Phosphate Dibasic | USP | 16.00 | 240.00 |
| 6 | 0.2700 | Sodium Phosphate Monobasic | USP | 2.70 | 40.50 |
| 7 | 3.0000 | Sorbitol Solution, 70 Percent | USP | 30.00 | 450.00 |
| 8 | 2.2500 | Propylene Glycol | USP | 22.50 | 337.50 |
| 9 | 5.0000 | Glycerin 99.7% Natural | USP | 50.00 | 750.00 |
| 10 | 1.2600 | PROSOLV ® SMCC 50 (Silicified Microcrystalline Cellulose) | NF | 12.60 | 189.00 |
| 11 | 0.2000 | Carboxymethylcellulose Sodium, Medium Viscosity, Viscosity of 2 Percent Aqueous Solution @ 25 DEG C: 400-800 cP, USP | USP | 2.00 | 30.00 |
| 12 | 0.2000 | Xanthan Gum FN | NF | 2.00 | 30.00 |
| 13 | 0.2000 | Cherry Flavor, Nat & Art | NA | 2.00 | 30.00 |
| 14 | 0.0020 | FD&C Red No. 40 | NA | 0.02 | 0.30 |
| 15 | 0.0002 | FD&C Yellow No. 6 | NA | 0.00 | 0.03 |
| 16 | 78.4278 | Purified Water | USP | 784.28 | 11764.17 |
| 17 | 5.0000 | Polyethylene Glycol 400 | NF | 50.00 | 750.00 |
| 18 | 0.1000 | Sucralose | NF | 1.00 | 15.00 |
| Total | 100.0000 | | | 1000.00 | 15000.00 | pylene glycol, glycerin, PEG 400). The batch composition (Table 1) specifies a 15 L production scale, with critical quality attributes including pH 6.5-8.0, viscosity 150-250 mPa·s, and particle size distribution ($d_{90}$<300 µm).

The formulation employs a dual preservative system (0.1% methylparaben+0.03% sodium benzoate) compliant with USP/NF standards, alongside taste-masking agents (cherry flavor, FD&C dyes) optimized for pediatric adherence. Container-closure systems (Table 2) utilize an 8 oz HDPE bottle with a child-resistant polypropylene closure, ensuring physicochemical stability and microbial integrity during storage. This example demonstrates the suspension's scalability, dose uniformity, and alignment with global pharmacopeial guidelines, providing a robust foundation for commercial production and clinical use in ADHD treatment.

Example 2: Method of Manufacturing as Shown in the Flow Chart of FIG. 1

| Step | Procedure |
|---|---|
| | Preparation of Phase 1: Shown in Order of Addition |
| 1. | Rinse all interior surfaces of compounding vessel (T-1) with Purified Water (PW) immediately prior to use. Allow to fully drain and dry. Charge T-1 with Propylene Glycol (1) |
| 2. | Add Methylparaben, NF to Propylene Glycol and mix until fully dissolved. |
| 3. | Total time for the Phase 1 completion. |
| 4. | Preparation of Phase 2: Shown in order of addition Rinse all interior surfaces of compounding vessel (T-2) with Purified Water (PW) immediately prior to use. Allow to fully drain. Charge T-2 with PW (3). |
| 5. | Begin mixing. |
| 6. | Add the following ingredients in the order shown below to the PW and mix. Carboxymethylcellulose Sodium, Medium Viscosity (Viscosity of 2 Percent Aqueous Solution @ 25 DEG C: 400-800 cP) (4) Xanthan Gum FN (5) PROSOLV ® SMCC 50M (Silicified Microcrystalline Cellulose) (6) Completely homogenized/suspended |
| 7. | Add the following ingredients in the order shown below to the PW and mix. Sodium Benzoate, Powder (7) Sodium Phosphate Dibasic (8) Sodium Phosphate Monobasic (9) Saccharin Sodium, Dihydrate, Powder (10) Completely homogenized/suspended |
| 8. | Add the following ingredients in the order shown below and continue mixing Polyethylene Glycol 400 (11) |
| 9. | Add Sorbitol Solution, 70 Percent and continue mixing. Sorbitol Solution, 70 Percent (12) Completely homogenized/suspended |
| 10. | Add Atomoxetine Hydrochloride and mix. Atomoxetine Hydrochloride (13) |
| 11. | Homogenize the suspension using a high-shear homogenizer. Completely Homogenized/suspended Note: Take samples from different location of the container to observe completion of homogenization using a glass bottles. If powder lumps are observed continue homogenization till fully suspended. Homogenization: T1 + T2 |
| 12. | Addition of Phase 1 into Phase 2: Slowly transfer the Phase 1 from vessel (T-1) into vessel (T-2) and mix until homogeneous. Completely homogeneous/suspended |
| 13. | Add the following ingredients in the order shown below and continue mixing Glycerine 99.7% Natural (14) Completely homogenized/suspended |
| 14. | Add FD&C Red No. 40, FD& C Yellow No. 6 and Cherry Flavor, Art & Nat and mix. (in the order shown below) FD&C Red NO. 40 (15) FD&C Yellow No. 6 (16) Nat & Art Cherry Flavor (17) Sucralose (18) Completely Homogeneous |
| 15. | Record the pH (Final pH should be between 6.5 and 8.0. Target pH = 7.2). If needed, adjust pH with sodium phosphate dibasic. |

Example 2 details a two-phase manufacturing process for producing the atomoxetine hydrochloride 20 mg/mL oral suspension. Phase 1 involves dissolving methylparaben in propylene glycol under controlled mixing conditions, while Phase 2 initiates with purified water as the base solvent. Key suspending agents-carboxymethylcellulose sodium, xanthan gum, and PROSOLV® SMCC 50—are sequentially added to Phase 2 and homogenized to form a stable dispersion. Sodium benzoate, phosphate buffers, saccharin sodium, and polyethylene glycol 400 are incorporated to optimize preservative efficacy, pH stability (target 7.2), and solubility. Atomoxetine hydrochloride is then suspended in the Phase 2 mixture using high-shear homogenization (IKA Labortechnik/Ultra-Turrax T25 S1) to achieve uniform particle distribution ($d_{90}$<300 μm).

The process concludes by combining Phases 1 and 2, followed by the addition of glycerin, cherry flavor, FD&C dyes, and sucralose. Critical quality controls include homogenization time limits (≤30 minutes) to prevent overheating, pH verification (6.5-8.0), and in-process checks for complete dissolution/suspension at each step. The method ensures batch consistency through defined mixer speeds, excipient addition sequences, and compliance with USP standards for viscosity (150-250 mPa·s) and particle size distribution. This scalable protocol supports commercial production while maintaining physicochemical stability and antimicrobial efficacy as demonstrated in subsequent examples.

Example 3: Six-Month Stability

| Product | Log Reduction Value | | | | | |
|---|---|---|---|---|---|---|
| | E. coli | P. aeruginosa | S. aureus | B. cepacia | C. albicans | A. brasiliensis |
| 14 days | | | | | | |
| Atomoxetine | >3.8 | >3.8 | >3.8 | >3.6 | >3.8 | 1.8 |
| 28 days | | | | | | |
| Atomoxetine | >3.8 | >3.8 | >3.8 | >3.6 | >3.8 | 1.9 |

Example 3 evaluates the antimicrobial efficacy and physicochemical stability of the atomoxetine hydrochloride 20 mg/mL oral suspension over six months under accelerated storage conditions. The formulation demonstrated robust microbial control, achieving log reduction values (LRVs) ≥3.8 for *Escherichia coli, Pseudomonas aeruginosa, Staphylococcus aureus*, and *Candida albicans* at both 14- and 28-day intervals. For *Burkholderia cepacia*, LRVs remained ≥3.6, while *Aspergillus brasiliensis* showed LRVs of 1.8 and 1.9 at 14 and 28 days, respectively. These results confirm compliance with USP <51> criteria for antimicrobial effectiveness, with no microbial proliferation observed post-challenge.

The suspension maintained physicochemical stability across critical parameters: pH (6.5-8.0), viscosity (150-250 mPa·s), and particle size distribution ($d_{90}$<300 μm) throughout the study. Sedimentation volume (≤40 mL/50 mL) and redispersibility (≥50%) met in-house specifications, ensuring dose uniformity. Accelerated stability data aligned with ICH guidelines, supporting a proposed shelf life of ≥24 months under recommended storage conditions (20-25° C.). These findings validate the formulation's resistance to microbial contamination and structural degradation, fulfilling regulatory requirements for commercial distribution.

Example 4: Test Specifications

| Test | Method | Acceptance Criteria |
|---|---|---|
| Appearance | In house | Pink, well-dispersed suspension |
| Taste and Flavor | In house | Sweet cherry aroma (and taste during product development) |
| Water Gain or Loss | In house | As reported (To evaluate stability trends) |
| Identification A (Chlorides, Test A) | USP <191>, | Yields a white, curdy precipitate with 0.1N silver nitrate test solution. |
| Identification B (by HPLC) | USP <621> | The retention time of the atomoxetine peaks from assay reference standard and the test sample solutions correspond. |

| Test | Method | Acceptance Criteria |
| --- | --- | --- |
| pH | USP <791> | 6.5-8.0 |
| Viscosity | USP <912> | 150-250 mPa · s |
| Specific Gravity | USP <841> | 1.000-1.200 |
| Particle Size Distribution | USP <429> | d10 < 30 μm<br>d50 < 100 μm<br>d90 < 300 μm |
| Deliverable Volume<br>A. FOR COMMERCIAL RELEASE<br>n = 10-30 containers | USP <698> | A. FOR COMMERCIAL RELEASE<br>The average volume of liquid obtained from the 10 containers is NLT 100%, and the volume of each of the 10 containers lies within the range of 95%-110% of the volume declared in the labeling. If A, the average volume is less than 100% of that declared in the labeling, but the volume of no container is outside the range of 95%-110%, or if B, the average volume is NLT 100% and the volume of NMT 1 container is outside the range of 95%-110%, but within the range of 90%-115%, perform the test on 20 additional containers. The average volume of liquid obtained from the 30 containers is NLT 100% of the volume declared in the labeling; and the volume obtained from NMT 1 of the 30 containers is outside the range of 95%-110%, but within the range of 90%-115% of the volume declared on the labeling. |
| B. FOR OTHER PURPOSES<br>n = 3 containers | | B. FOR OTHER TESTING PURPOSES<br>The average volume of liquid obtained from the 3 containers is NLT 100%, and the volume of each of the 3 containers lies within the range of 95%-110% of the volume declared in the labeling. |
| Sedimentation Rate (from 50 mL) | In house | 0-40 mL of sediments, after 24 hrs |
| Assessment of Re-Dispersibility | In house (ICH Q6A) | NLT 50% |
| Assay (n = 3) | USP <621> | Contains an amount of atomoxetine hydroxide equivalent to 90.0-110.0% of the labeled amount of atomoxetine ($C_{17}H_{21}NO$).<br>RSD ≤ 3.0% |
| Content Uniformity<br>A. FOR COMMERCIAL RELEASE<br>n = 10-30 containers | USP <905> | A. FOR COMMERCIAL RELEASE<br><br>The acceptance value of the first 10 dosage units is less than or equal to L1%. If the acceptance value is > L1%, test the next 20 units, and calculate the acceptance value. The requirements are met if the final acceptance value of the 30 dosage units is ≤ L1%, and no individual content of any dosage unit is less than [1−(0.01) (L2)]M nor more than [1+(0.01)(L2)]M as specified in the Calculation of Acceptance Value under Content Uniformity in USP <905>. L1 is 15.0 and L2 is 25.0. |
| B. FOR OTHER PURPOSES<br>n = 1 containers | B. FOR OTHER TESTING PURPOSES<br>TOP: 90.0-110.0%<br>MIDDLE: 90.0-110.0%<br>BOTTOM: 90.0-110.0% | B. FOR OTHER PURPOSES<br>n = 1 containers |
| Impurities and Related Substances (Procedure 1) | USP <621> | Mandelic Acid: NMT 0.10%<br>Atomoxetine related compound A: NMT 0.10%<br>Desmethyl Atomoxetine: NMT 0.30%<br>Any other unknown individual impurity: NMT 0.10%<br>Total impurities: NMT 0.50% |

-continued

| Test | Method | Acceptance Criteria |
|---|---|---|
| Impurities and Related Substances (Procedure 2) | USP <621> | Atomoxetine S-isomer: NMT 0.5% Atomoxetine related compound B: NMT 0.1% Atomoxetine related compound C: NMT 0.1% |
| Dissolution n = 6 for release testing n = 12 for comparative testing for clinical and related tests | USP <711> | Not less than 80% (Q) of the labeled amount atomoxetine (C17H21NO) is dissolved in 20 minutes. Report each vessel, mean, range, SD & RSD |
| Microbial Bioburden Testing | USP <61> | Total Aerobic Microbial Count (TAMC): NMT 102 CFU/mL Total Combined Yeasts/Molds Count (TYMC): NMT 101 CFU/mL |
| *Escherichia coli* Testing | USP <62> | Absence of *Escherichia coli* (in 1 mL of suspension) |
| *Burkholderia cepacia* complex (BCC) Testing | USP <60> | Absence of any BCC organisms |
| Antimicrobial Effectiveness Test | USP <51> | Bacteria: NLT 1.0 log reduction from the initial count at 14 days and no increase from 14 days' count at 28 day Yeast and Mold: No increase from the initial calculated count at 14 and 28 days |
| Antimicrobial Agents Assay | USP <341> | Sodium Benzoate: 80-120% Methylparaben: 80-120% |
| Estimation of p-Hydroxybenzoic Acid | USP <621> | NMT 1.5% for release testing and NMT 7.0% for stability testing. |

Example 4 outlines the comprehensive quality control specifications and analytical methods for the atomoxetine hydrochloride 20 mg/mL oral suspension. The tests evaluate critical physicochemical, microbiological, and performance attributes to ensure product safety, efficacy, and regulatory compliance. Key parameters include appearance (pink, well-dispersed suspension), pH (6.5-8.0), viscosity (150-250 mPa·s), particle size distribution ($d_{90}$<300 μm), and deliverable volume consistency (95-110% of labeled volume).

Assay criteria require 90.0-110.0% of the labeled atomoxetine content, with stringent impurity limits (e.g., ≤0.50% total impurities, ≤0.30% desmethyl atomoxetine). Dissolution testing confirms ≥80% drug release within 20 minutes, while microbial bioburden thresholds (≤$10^2$ CFU/mL aerobic organisms, absence of *E. coli* and *Burkholderia cepacia*) safeguard against contamination.

The example further details antimicrobial effectiveness, content uniformity, and stability-indicating methods aligned with USP chapters <51>, <905>, and <621>. Acceptance criteria for preservative assays (80-120% sodium benzoate and methylparaben) and sedimentation/redispersibility (≤40 mL sedimentation, ≥50% redispersibility) ensure shelf-life robustness. These specifications collectively validate the suspension's physicochemical stability, dose uniformity, and microbiological quality, supporting its suitability for commercial use in ADHD treatment while adhering to global pharmacopeial standards.

Example 5: Atomoxetine Hydrochloride 20 mg/mL Oral Suspension, Fasting Study (Analyte: Atomoxetine) 90% Confidence Interval

| Parameter | Geometric Mean | Geometric Mean R | (T/R) Ratio | L90 | U90 | Power |
|---|---|---|---|---|---|---|
| lnCmax | 454.4372 | 436.7516 | 104.05% | 93.76% | 115.47% | 0.9683 |
| lnAUCt | 2161.8577 | 2177.4909 | 99.28% | 95.83% | 102.86% | 1.0000 |
| lnAUCi | 2230.7312 | 2248.1059 | 99.23% | 95.52% | 103.08% | 1.0000 |

L90: 90% Lower Confidence Interval
U90: 90% Upper Confidence Interval

Example 5 demonstrates the bioequivalence of the atomoxetine hydrochloride oral suspension (test formulation) to Strattera® oral capsules (reference formulation) under fasting conditions. The study evaluated pharmacokinetic parameters in a crossover design, measuring maximum plasma concentration (Cmax), area under the concentration-time curve from time zero to the last measurable concentration (AUCt), and area under the concentration-time curve extrapolated to infinity (AUCi). Geometric mean ratios (T/R) for Cmax, AUCt, and AUCi were 104.05%, 99.28%, and 99.23%, respectively, with 90% confidence intervals fully contained within the 80-125% bioequivalence range. Specifically, Cmax showed a 90% CI of 93.76-115.47%, while AUCt and AUCi exhibited narrower intervals of 95.83-102.86% and 95.52-103.08%, respectively. Statistical power exceeded 96% for all parameters, confirming robust study design.

These results validate that the oral suspension achieves systemic exposure comparable to the reference capsule, with no clinically significant differences in absorption rate or extent. The formulation's pharmacokinetic profile supports its use as an interchangeable therapeutic option, particularly beneficial for patients requiring dose flexibility or those with difficulty swallowing solid dosage forms. The data further confirm predictable dose proportionality and alignment with established safety and efficacy profiles of atomoxetine in ADHD treatment.

The invention claimed is:

1. An oral liquid suspension comprising:
2.2850±0.45 wt. % atomoxetine, or a pharmaceutically acceptable salt thereof;
0.1000±0.05 wt. % methylparaben;
0.0300±0.006 wt. % sodium benzoate;
0.0750±0.015 wt. % saccharin sodium, dihydrate;
1.6000±0.32 wt. % sodium phosphate dibasic;
0.2700±0.054 wt. % sodium phosphate monobasic;
3.0000±0.6 wt. % of a 70% sorbitol solution;
2.2500±0.5 wt. % propylene glycol;
5.0000±1 wt. % glycerin;
1.2600±0.25 wt. % silicified microcrystalline cellulose;
0.2000±0.04 wt. % carboxymethylcellulose sodium;
0.2000±0.04 wt. % xanthan gum;
0.2000±0.04 wt. % cherry flavor;
0.2000±0.04 wt. % FD&C Red No. 40;
0.0020±0.0004 wt. % FD&C Yellow No. 6;
78.4278±7.5 wt. % purified water;
5.0000±1 wt. % polyethylene glycol 400; and
0.1000±0.05 wt. % sucralose;
wherein,
the oral liquid suspension has a pH of 6.5-8.0;
the oral liquid suspension has a viscosity of 150-250 mPa·s; and
the oral liquid suspension has a specific gravity of 1.000-1.200.

2. The oral liquid suspension of claim 1, comprising 2.2850±0.45 wt. % atomoxetine hydrochloride.

3. The oral liquid suspension of claim 1, comprising 2.2850±0.25 wt. % atomoxetine hydrochloride.

4. The oral liquid suspension of claim 1, comprising 2.2850±0.10 wt. % atomoxetine hydrochloride.

5. The oral liquid suspension of claim 1, comprising 2.2850±0.05 wt. % atomoxetine hydrochloride.

6. The oral liquid suspension of claim 1, comprising 2.2850±0.025 wt. % atomoxetine hydrochloride.

7. The oral liquid suspension of claim 1, comprising 2.2850±0.015 wt. % atomoxetine hydrochloride.

8. The oral liquid suspension of claim 1, comprising 2.2850 wt. % atomoxetine hydrochloride.

9. The oral liquid suspension of claim 1, having a particle size distribution of $d_{10}<30$ μm.

10. The oral liquid suspension of claim 1, having a particle size distribution of $d_{50}<100$ μm.

11. The oral liquid suspension of claim 1, having a particle size distribution of $d_{90}<300$ μm.

12. The oral liquid suspension of claim 1, having a particle size distribution of $d_{10}<30$ μm; $d_{50}<100$ μm; and $d_{90}<300$ μm.

13. The oral liquid suspension of claim 1, wherein the oral liquid suspension has redispersibility characterized by ≥50% resuspension within 30 s.

14. The oral liquid suspension of claim 1, wherein the oral liquid suspension has redispersibility characterized by: (a) sedimentation volume ≤40 mL per 50 mL suspension after 24 hr static storage at 25° C.; and (b) ≥50% particle resuspension within 30 seconds of manual shaking, as measured per ICH Q6A guidelines.

15. The oral liquid suspension of claim 1, wherein the oral liquid suspension has redispersibility that achieves uniform dispersion within ≤15 seconds of mechanical agitation, at 60 RPM, after 6 months accelerated storage at 40° C./75% RH.

16. The oral liquid suspension of claim 1, wherein the oral liquid suspension has a redispersibility, complying with USP <601> redispersibility criteria: ≥90% of settled particles resuspend within 30 seconds of manual shaking, with no caking observed.

17. The oral liquid suspension of claim 1, wherein the oral liquid suspension has redispersibility, retaining ≥75% redispersibility after 24 months at 25° C./60% RH, confirmed by sedimentation volume ≤40 mL and $d_{90}<300$ μm.

18. The oral liquid suspension of claim 1, wherein the oral liquid suspension exhibits synergistic antimicrobial efficacy characterized by: (a) a log reduction value of ≥3.8 for *Escherichia coli, Pseudomonas aeruginosa, Staphylococcus aureus*, and *Candida albicans* at pH 7.2-7.6 after 14 and 28 days of storage; (b) a log reduction value of ≥3.6 for *Burkholderia cepacia* without benzoic acid crystallization after 14 and 28 days of storage; and (c) a log reduction value of ≥1.8 for *Aspergillus brasiliensis* despite sorbitol-induced water activity ≤0.95 after 14 days and ≥1.9 after 28 days of storage; wherein ≥50% redispersibility is retained under 6 months accelerated storage at 40° C./75% RH.

19. The oral liquid suspension of claim 1, wherein the oral liquid suspension exhibits antimicrobial efficacy with: (a) methylparaben at 0.08-0.12% w/w and sodium benzoate at 0.025-0.035% w/w; (b) a preservative ratio, methylparaben: sodium benzoate, of 2.5:1 to 4:1 w/w; and (c) compliance with USP <51> antimicrobial effectiveness testing criteria for Category 1 products, oral aqueous formulations, demonstrating no microbial recovery ≥1.0 $\log_{10}$ CFU/mL for bacteria and ≥0.5 $\log_{10}$ CFU/mL for fungi after 28 days.

20. The oral liquid suspension of claim 1, wherein the oral liquid suspension exhibits the antimicrobial efficacy: (a) ≥4.0 log reduction against *Klebsiella pneumoniae*, ATCC 4352, and *Enterococcus faecalis*, ATCC 29212, after 14 days at pH 7.4±0.2; (b) ≤0.3% benzoic acid crystallization after 24 months at 25° C./60% RH; and (c) water activity ($a_w$) ≤0.92 measured via capacitive hygrometer, compliance with USP <922>, inhibiting osmophilic fungal growth.

21. The oral liquid suspension of claim 1, wherein the ratio of methylparaben:sodium benzoate is 2.5:1 to 4:1 w/w.

22. An oral liquid suspension comprising:
2.2850±0.45 wt. % atomoxetine, or a pharmaceutically acceptable salt thereof;
0.1000±0.05 wt. % methylparaben;
0.0300±0.006 wt. % sodium benzoate;
0.0750±0.015 wt. % saccharin sodium, dihydrate;
1.6000±0.32 wt. % sodium phosphate dibasic;
0.2700±0.054 wt. % sodium phosphate monobasic;
3.0000±0.6 wt. % of a 70% sorbitol solution;
2.2500±0.5 wt. % propylene glycol;
5.0000±1 wt. % glycerin;
1.2600±0.25 wt. % silicified microcrystalline cellulose;
0.2000±0.04 wt. % carboxymethylcellulose sodium;
0.2000±0.04 wt. % xanthan gum;
0.2000±0.04 wt. % cherry flavor;
0.2000±0.04 wt. % FD&C Red No. 40;

0.0020±0.0004 wt. % FD&C Yellow No. 6;
78.4278±7.5 wt. % purified water;
5.0000±1 wt. % polyethylene glycol 400; and
0.1000±0.05 wt. % sucralose;
wherein,
the oral liquid suspension has a pH of 6.5-8.0;
the oral liquid suspension has a viscosity of 150-250 mPa·s;
the oral liquid suspension has a specific gravity of 1.000-1.200; and
the oral liquid suspension has a particle size distribution of $d_{10}$<30 μm; $d_{50}$<100 μm; and $d_{90}$<300 μm.

23. The oral liquid suspension of claim 22, wherein the oral liquid suspension has redispersibility characterized by: (a) sedimentation volume ≤40 mL per 50 mL suspension after 24 hr static storage at 25° C.; and (b) ≥50% particle resuspension within 30 seconds of manual shaking, as measured per ICH Q6A guidelines.

24. The oral liquid suspension of claim 22, wherein the oral liquid suspension has redispersibility that achieves uniform dispersion within ≤15 seconds of mechanical agitation, 60 RPM, after 6 months accelerated storage at 40° C./75% RH.

25. The oral liquid suspension of claim 22, wherein the oral liquid suspension has a redispersibility, complying with USP <601> redispersibility criteria: ≥90% of settled particles resuspend within 30 seconds of manual shaking, with no caking observed.

26. The oral liquid suspension of claim 22, wherein the oral liquid suspension has redispersibility, retaining ≥75% redispersibility after 24 months at 25° C./60% RH, confirmed by sedimentation volume ≤40 mL and $d_{90}$<300 μm.

27. The oral liquid suspension of claim 22, wherein the oral liquid suspension exhibits synergistic antimicrobial efficacy characterized by: (a) a log reduction value of ≥3.8 for *Escherichia coli, Pseudomonas aeruginosa, Staphylococcus aureus*, and *Candida albicans* at pH 7.2-7.6 after 14 and 28 days of storage; (b) a log reduction value of ≥3.6 for *Burkholderia cepacia* without benzoic acid crystallization after 14 and 28 days of storage; and (c) a log reduction value of ≥1.8 for *Aspergillus brasiliensis* despite sorbitol-induced water activity ≤0.95 after 14 days and ≥1.9 after 28 days of storage; wherein ≥50% redispersibility is retained under 6 months accelerated storage at 40° C./75% RH.

28. The oral liquid suspension of claim 22, wherein the oral liquid suspension exhibits antimicrobial efficacy with: (a) methylparaben at 0.08-0.12% w/w and sodium benzoate at 0.025-0.035% w/w; (b) a preservative ratio, methylparaben:sodium benzoate, of 2.5:1 to 4:1 w/w; and (c) compliance with USP <51> antimicrobial effectiveness testing criteria for Category 1 products, oral aqueous formulations, demonstrating no microbial recovery ≥1.0 $\log_{10}$ CFU/mL for bacteria and ≥0.5 $\log_{10}$ CFU/mL for fungi after 28 days.

29. The oral liquid suspension of claim 22, wherein the oral liquid suspension exhibits the antimicrobial efficacy: (a) ≥4.0 log reduction against *Klebsiella pneumoniae*, ATCC 4352, and *Enterococcus faecalis*, ATCC 29212, after 14 days at pH 7.4±0.2; (b) ≤0.3% benzoic acid crystallization after 24 months at 25° C./60% RH; and (c) water activity ($a_w$) ≤0.92 measured via capacitive hygrometer, compliance with USP <922>, inhibiting osmophilic fungal growth.

30. The oral liquid suspension of claim 22, wherein the ratio of methylparaben:sodium benzoate is 2.5:1 to 4:1 w/w.

* * * * *